US012127071B2

(12) United States Patent
Joseph

(10) Patent No.: US 12,127,071 B2
(45) Date of Patent: Oct. 22, 2024

(54) METHODS AND SYSTEMS FOR DETECTING AGGREGATION EVENTS

(71) Applicant: Bytedance Inc., Wilmington, DE (US)

(72) Inventor: Anthony Joseph, Bellevue, WA (US)

(73) Assignee: BYTEDANCE INC., Wilmington, DE (US)

( * ) Notice: Subject to any disclaimer, the term of this patent is extended or adjusted under 35 U.S.C. 154(b) by 0 days.

(21) Appl. No.: 17/478,175

(22) Filed: Sep. 17, 2021

(65) Prior Publication Data

US 2022/0109946 A1 Apr. 7, 2022

Related U.S. Application Data

(63) Continuation of application No. 16/870,535, filed on May 8, 2020, now Pat. No. 11,153,711, which is a continuation of application No. 15/476,792, filed on Mar. 31, 2017, now Pat. No. 10,687,167.

(60) Provisional application No. 62/315,754, filed on Mar. 31, 2016.

(51) Int. Cl.
*H04W 4/021* (2018.01)
*G01C 21/34* (2006.01)
*G01C 21/36* (2006.01)
*H04W 4/029* (2018.01)

(52) U.S. Cl.
CPC ........ *H04W 4/021* (2013.01); *G01C 21/3423* (2013.01); *G01C 21/3476* (2013.01); *G01C 21/362* (2013.01); *G01C 21/3661* (2013.01); *G01C 21/3664* (2013.01); *G01C 21/3679* (2013.01); *H04W 4/029* (2018.02)

(58) Field of Classification Search
CPC ... H04W 4/021; G06Q 50/01; G06Q 30/0261; G06Q 30/0259; G01C 21/3679; G06F 17/30241
See application file for complete search history.

(56) References Cited

U.S. PATENT DOCUMENTS

| | | | |
|---|---|---|---|
| 5,909,189 A | 6/1999 | Blackman et al. | |
| 6,154,745 A | 11/2000 | Kari et al. | |
| 6,202,023 B1 | 3/2001 | Hancock et al. | |
| 6,219,614 B1 | 4/2001 | Uchigaki et al. | |
| 6,252,544 B1 | 6/2001 | Hoffberg | |
| 6,253,069 B1 | 6/2001 | Mankovitz | |
| 6,332,127 B1 | 12/2001 | Bandera et al. | |
| 6,353,398 B1 | 3/2002 | Amin et al. | |
| 6,360,167 B1 | 3/2002 | Millington et al. | |
| 6,381,603 B1 | 4/2002 | Chan et al. | |
| 6,421,675 B1 | 7/2002 | Ryan et al. | |
| 6,429,813 B2 | 8/2002 | Feigen | |
| 6,571,279 B1 | 5/2003 | Herz et al. | |
| 6,647,257 B2 | 11/2003 | Owensby | |
| 6,647,414 B1 | 11/2003 | Eriksson et al. | |
| 6,741,188 B1 | 5/2004 | Miller et al. | |

(Continued)

OTHER PUBLICATIONS

Hristova; Ad-me_ wireless advertising adapted to the user location, device and emotions; Conf on Sys Sciences 2004; pp. 1-10; 2004.

(Continued)

*Primary Examiner* — Matthew C Sams
(74) *Attorney, Agent, or Firm* — Alston & Bird LLP

(57) ABSTRACT

In general, embodiments of the present invention provide systems, methods and computer readable media for detecting aggregation events.

20 Claims, 9 Drawing Sheets

(56) References Cited

U.S. PATENT DOCUMENTS

| | | | |
|---|---|---|---|
| 7,136,875 B2 | 11/2006 | Anderson et al. | |
| 7,177,623 B2 | 2/2007 | Baldwin | |
| 7,246,109 B1 | 7/2007 | Ramaswamy | |
| 7,561,169 B2 | 7/2009 | Carroll | |
| 8,284,748 B2 | 10/2012 | Borghei | |
| 8,521,131 B1 | 8/2013 | Ramalingam et al. | |
| 8,777,754 B1 | 7/2014 | Santini et al. | |
| 9,043,329 B1* | 5/2015 | Patton | G06F 16/951 |
| | | | 707/740 |
| 9,143,601 B2 | 9/2015 | Padmanabhan et al. | |
| 9,158,974 B1 | 10/2015 | Laska et al. | |
| 9,313,616 B2* | 4/2016 | Mitchell | G06Q 10/083 |
| 9,560,426 B1 | 1/2017 | Daniel | |
| 9,609,577 B1 | 3/2017 | Ramalingam et al. | |
| 9,628,950 B1 | 4/2017 | Noeth et al. | |
| 9,648,056 B1 | 5/2017 | Kim et al. | |
| 9,652,525 B2* | 5/2017 | Patton | G06F 16/487 |
| 9,940,635 B1 | 4/2018 | Shariff et al. | |
| 10,057,115 B2 | 8/2018 | Baca et al. | |
| 10,129,694 B1 | 11/2018 | Parshin et al. | |
| 10,210,548 B1 | 2/2019 | Wai | |
| 10,267,643 B2* | 4/2019 | Mitchell | G01C 21/367 |
| 10,438,240 B1 | 10/2019 | Ehrlacher et al. | |
| 10,521,815 B1 | 12/2019 | Joseph et al. | |
| 10,523,625 B1 | 12/2019 | Allen et al. | |
| 10,535,076 B1 | 1/2020 | Thacker et al. | |
| 10,687,167 B1 | 6/2020 | Joseph | |
| 10,929,868 B2 | 2/2021 | Joseph et al. | |
| 11,062,348 B1 | 7/2021 | Thacker et al. | |
| 2002/0046084 A1 | 4/2002 | Steele et al. | |
| 2002/0065068 A1 | 5/2002 | Nobukiyo | |
| 2002/0095333 A1 | 7/2002 | Jokinen et al. | |
| 2002/0103892 A1 | 8/2002 | Rieger | |
| 2002/0120629 A1 | 8/2002 | Leonard | |
| 2002/0128903 A1 | 9/2002 | Kernahan | |
| 2002/0164977 A1 | 11/2002 | Link et al. | |
| 2003/0014213 A1 | 1/2003 | Yokota | |
| 2003/0065565 A1 | 4/2003 | Wagner et al. | |
| 2003/0065595 A1 | 4/2003 | Anglum | |
| 2004/0006425 A1 | 1/2004 | Wood et al. | |
| 2004/0133446 A1 | 7/2004 | Myrick et al. | |
| 2004/0210386 A1 | 10/2004 | Wood et al. | |
| 2004/0254723 A1 | 12/2004 | Tu | |
| 2004/0254861 A1 | 12/2004 | Pentel | |
| 2005/0209921 A1 | 9/2005 | Roberts et al. | |
| 2005/0261822 A1 | 11/2005 | Wako | |
| 2005/0288959 A1 | 12/2005 | Eraker et al. | |
| 2006/0026067 A1 | 2/2006 | Nicholas et al. | |
| 2006/0161475 A1 | 7/2006 | Redford et al. | |
| 2006/0178932 A1 | 8/2006 | Lang | |
| 2006/0238379 A1 | 10/2006 | Kimchi et al. | |
| 2007/0208616 A1 | 9/2007 | Choi | |
| 2008/0021637 A1 | 1/2008 | Staton et al. | |
| 2008/0153487 A1 | 6/2008 | Martin et al. | |
| 2008/0270163 A1 | 10/2008 | Green | |
| 2009/0070220 A1 | 3/2009 | Gross | |
| 2010/0130226 A1 | 5/2010 | Arrasvuori et al. | |
| 2011/0029385 A1 | 2/2011 | Engel et al. | |
| 2011/0112892 A1 | 5/2011 | Tarantino | |
| 2011/0238517 A1 | 9/2011 | Ramalingam et al. | |
| 2011/0276393 A1 | 11/2011 | Srinivasan et al. | |
| 2011/0320715 A1 | 12/2011 | Ickman et al. | |
| 2012/0030048 A1 | 2/2012 | Manley et al. | |
| 2012/0035997 A1 | 2/2012 | Burgess et al. | |
| 2012/0088523 A1 | 4/2012 | Shirakawa et al. | |
| 2012/0136865 A1* | 5/2012 | Blom | G06F 16/29 |
| | | | 707/E17.046 |
| 2012/0310527 A1 | 12/2012 | Yariv et al. | |
| 2013/0021174 A1 | 1/2013 | Silzer et al. | |
| 2013/0091452 A1 | 4/2013 | Sorden et al. | |
| 2013/0117365 A1 | 5/2013 | Padmanabhan et al. | |
| 2013/0129060 A1 | 5/2013 | Gopalakrishnan et al. | |
| 2013/0198281 A1 | 8/2013 | Scuba et al. | |
| 2013/0218682 A1 | 8/2013 | Alterman et al. | |
| 2013/0225196 A1* | 8/2013 | James | H04W 4/022 |
| | | | 455/456.1 |
| 2013/0275192 A1 | 10/2013 | Aissa | |
| 2013/0282490 A1 | 10/2013 | Kramer et al. | |
| 2013/0304488 A1 | 11/2013 | Girao et al. | |
| 2013/0317921 A1 | 11/2013 | Havas | |
| 2013/0324160 A1 | 12/2013 | Sabatellil et al. | |
| 2014/0040068 A1 | 2/2014 | Mohan et al. | |
| 2014/0073362 A1 | 3/2014 | Kawata et al. | |
| 2014/0087780 A1 | 3/2014 | Abhyanker et al. | |
| 2014/0100945 A1 | 4/2014 | Kitts et al. | |
| 2014/0114866 A1 | 4/2014 | Abhyanker | |
| 2014/0129337 A1 | 5/2014 | Otremba et al. | |
| 2014/0171099 A1 | 6/2014 | Sydir et al. | |
| 2014/0180790 A1 | 6/2014 | Boal | |
| 2014/0199961 A1 | 7/2014 | Mohammed et al. | |
| 2014/0214465 A1 | 7/2014 | L'Heureux et al. | |
| 2014/0257877 A1 | 9/2014 | L'Heureux et al. | |
| 2014/0358673 A1 | 12/2014 | Sim et al. | |
| 2015/0031388 A1 | 1/2015 | Chatterjee et al. | |
| 2015/0058941 A1 | 2/2015 | Lyman et al. | |
| 2015/0088651 A1 | 3/2015 | Geiger | |
| 2015/0095355 A1 | 4/2015 | Patton | |
| 2015/0120405 A1 | 4/2015 | Kavana | |
| 2015/0120453 A1 | 4/2015 | Lee et al. | |
| 2015/0148060 A1 | 5/2015 | Parab et al. | |
| 2015/0148061 A1 | 5/2015 | Koukoumidis et al. | |
| 2015/0169629 A1 | 6/2015 | Van et al. | |
| 2015/0181303 A1 | 6/2015 | Amano et al. | |
| 2015/0213357 A1 | 7/2015 | Gomez-Rosado et al. | |
| 2015/0269608 A1 | 9/2015 | Kimura et al. | |
| 2015/0294335 A1 | 10/2015 | Hu et al. | |
| 2015/0302456 A1 | 10/2015 | Rego et al. | |
| 2015/0341999 A1 | 11/2015 | Qiao et al. | |
| 2015/0365794 A1 | 12/2015 | Hardwick et al. | |
| 2016/0005280 A1 | 1/2016 | Aska et al. | |
| 2016/0005281 A1 | 1/2016 | Laska et al. | |
| 2016/0027056 A1 | 1/2016 | Taslimi et al. | |
| 2016/0155088 A1 | 6/2016 | Pylappan et al. | |
| 2016/0180476 A1 | 6/2016 | Talwar | |
| 2016/0188596 A1 | 6/2016 | Keggi et al. | |
| 2016/0203506 A1 | 7/2016 | Butler et al. | |
| 2016/0307151 A1 | 10/2016 | Grabovski et al. | |
| 2016/0314429 A1 | 10/2016 | Gillen et al. | |
| 2016/0343027 A1 | 11/2016 | Cheng et al. | |
| 2017/0024682 A1 | 1/2017 | Piccionelli | |
| 2017/0032416 A1 | 2/2017 | Soni et al. | |
| 2017/0034659 A1 | 2/2017 | Shnitzer et al. | |
| 2018/0225687 A1 | 8/2018 | Ahmed et al. | |
| 2019/0035241 A1 | 1/2019 | Laska et al. | |
| 2019/0261131 A1* | 8/2019 | Keil | H04W 4/022 |
| 2019/0340876 A1 | 11/2019 | Northrup et al. | |

OTHER PUBLICATIONS

Kartik; Deal or no deal Catering to user preferences; Pervasive Computing and Communication; pp. 199-202; 2014.

U.S. Application as filed Jun. 6, 2016, U.S. Appl. No. 15/174,156.

U.S. Application as filed Jun. 6, 2016, U.S. Appl. No. 15/174, 164.

U.S. Application as filed Jun. 6, 2016, U.S. Appl. No. 15/174, 173.

U.S. Application filed on Jun. 6, 2016, U.S. Appl. No. 15/174,156.

U.S. Appl. No. 16/870,535, filed May 8, 2020, U.S. Pat. No. 11,153,711, Issued.

U.S. Appl. No. 15/476,792, filed Mar. 31, 2017, U.S. Pat. No. 10,687,167, Issued.

Hristova, Nataliya and O'Hare, G.M.P. "Ad-me: Wireless Advertising Adapted to User Location, Device, and Emotions." Hawaii International Conference on System Sciences, IEEE, 2004. (Year: 2004).

* cited by examiner

METHODS AND SYSTEMS FOR DETECTING AGGREGATION EVENTS

CROSS REFERENCE TO RELATED APPLICATIONS

This application is a continuation of and claims priority to U.S. application Ser. No. 16/870,535, titled "METHODS AND SYSTEMS FOR DETECTING AGGREGATION EVENTS," filed May 8, 2020, which is a continuation of U.S. application Ser. No. 15/476,792, titled "METHODS AND SYSTEMS FOR DETECTING AGGREGATION EVENTS," filed Mar. 31, 2017, which claims the benefit of U.S. Provisional Application Ser. No. 62/315,754 titled "METHODS AND SYSTEMS FOR DETECTING AGGREGATION EVENTS," filed on Mar. 31, 2016, the entireties of which are hereby incorporated by reference.

TECHNOLOGICAL FIELD

Example embodiments of the present invention relate generally to location services and, more particularly, to methods and systems for aggregating location services data from multiple mobile devices to detect events.

BACKGROUND

The applicant has discovered problems with current methods, systems, and apparatuses for providing location-based services. Through applied effort, ingenuity, and innovation, Applicant has solved many of these identified problems by developing a solution that is embodied by the present invention, which is described in detail below.

BRIEF SUMMARY

Accordingly, a method, apparatus, and computer program detect events based on location data provided from a plurality of mobile devices. Example embodiments may include methods, systems, apparatuses, and the like that detect and filter location services data to identify congregations of devices. For example, embodiments include systems that provide for improved filtering and processing of location services data that improve the accuracy and speed of event detection operations. Embodiments further leverage access to wireless carrier systems and application programming interfaces to improve data gathering operations for mobile devices. Embodiments may use identified congregations of users to indicate the presence of events, and further embodiments may identify the location and type of these events using access to both internal and external systems. Upon detection of an event, embodiments may establish a virtual perimeter about a location associated with the event, such that upon entering the virtual perimeter, particular actions are taken by the external system. For example, after identifying an event and establishing a virtual perimeter, embodiments may trigger notifications to other mobile devices entering the area about the event. Alternatively or additionally, entry to the virtual perimetered area may trigger a user profile update or data storage operation for a user account associated with the mobile device entering the virtual perimeter (e.g., identifying the user as a football fan upon entering an event determined to be a professional football game).

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
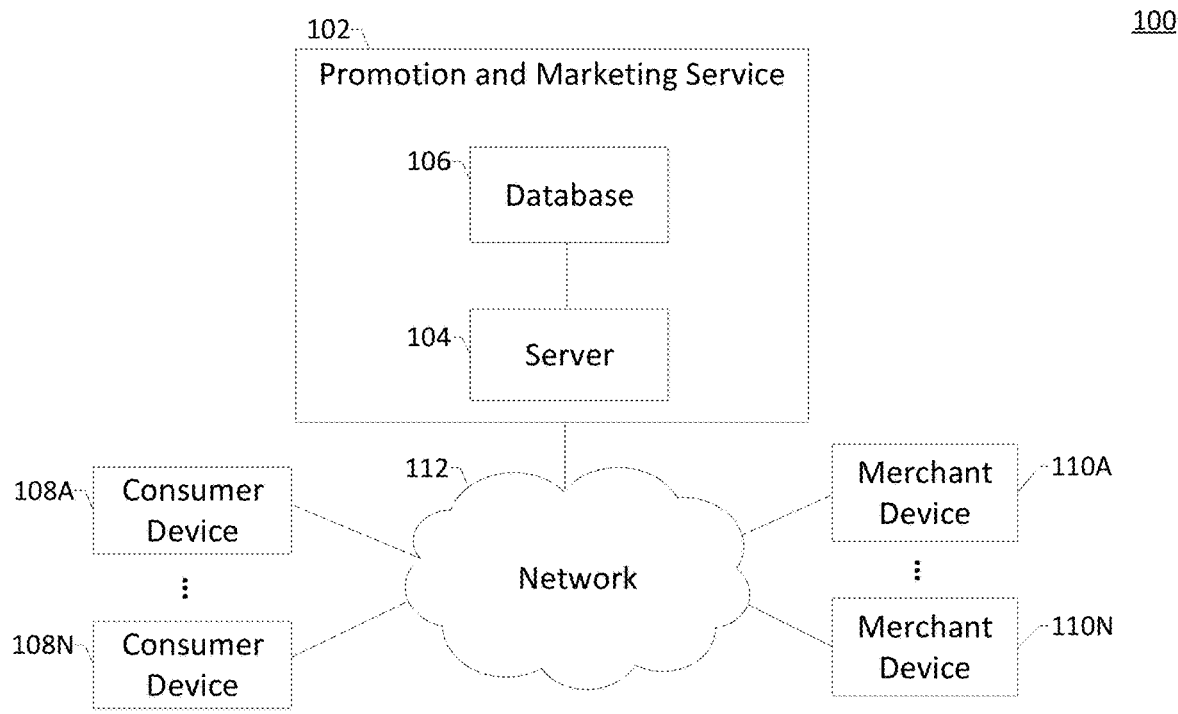
Figure 2:
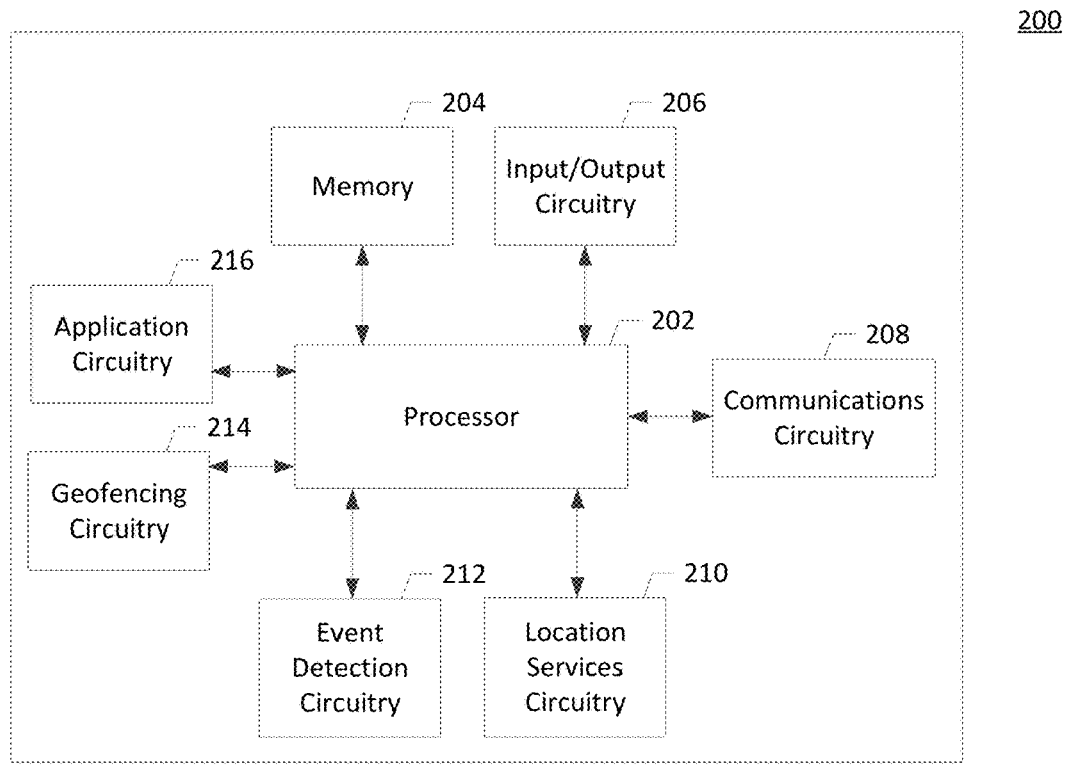
Figure 3:
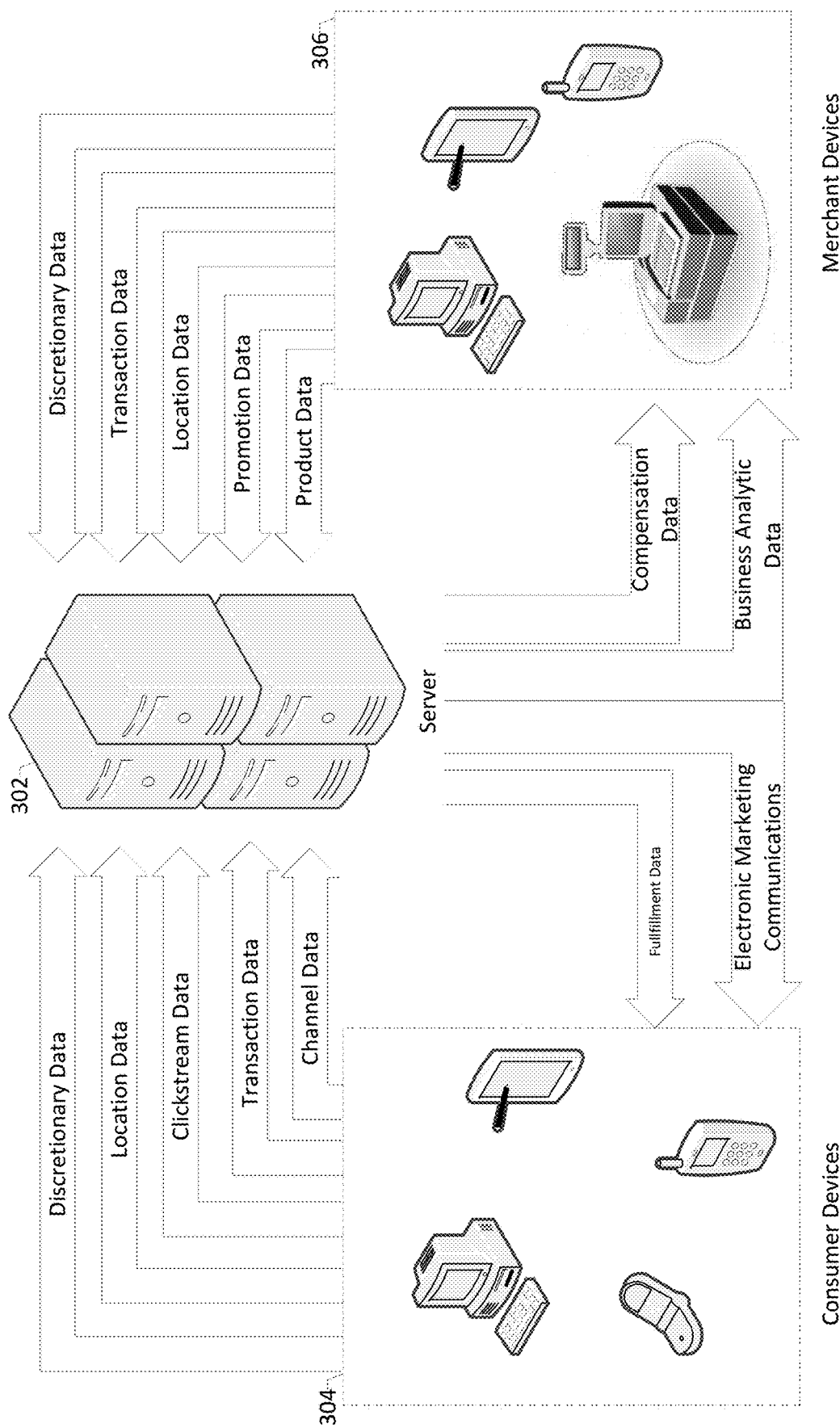
Figure 4:
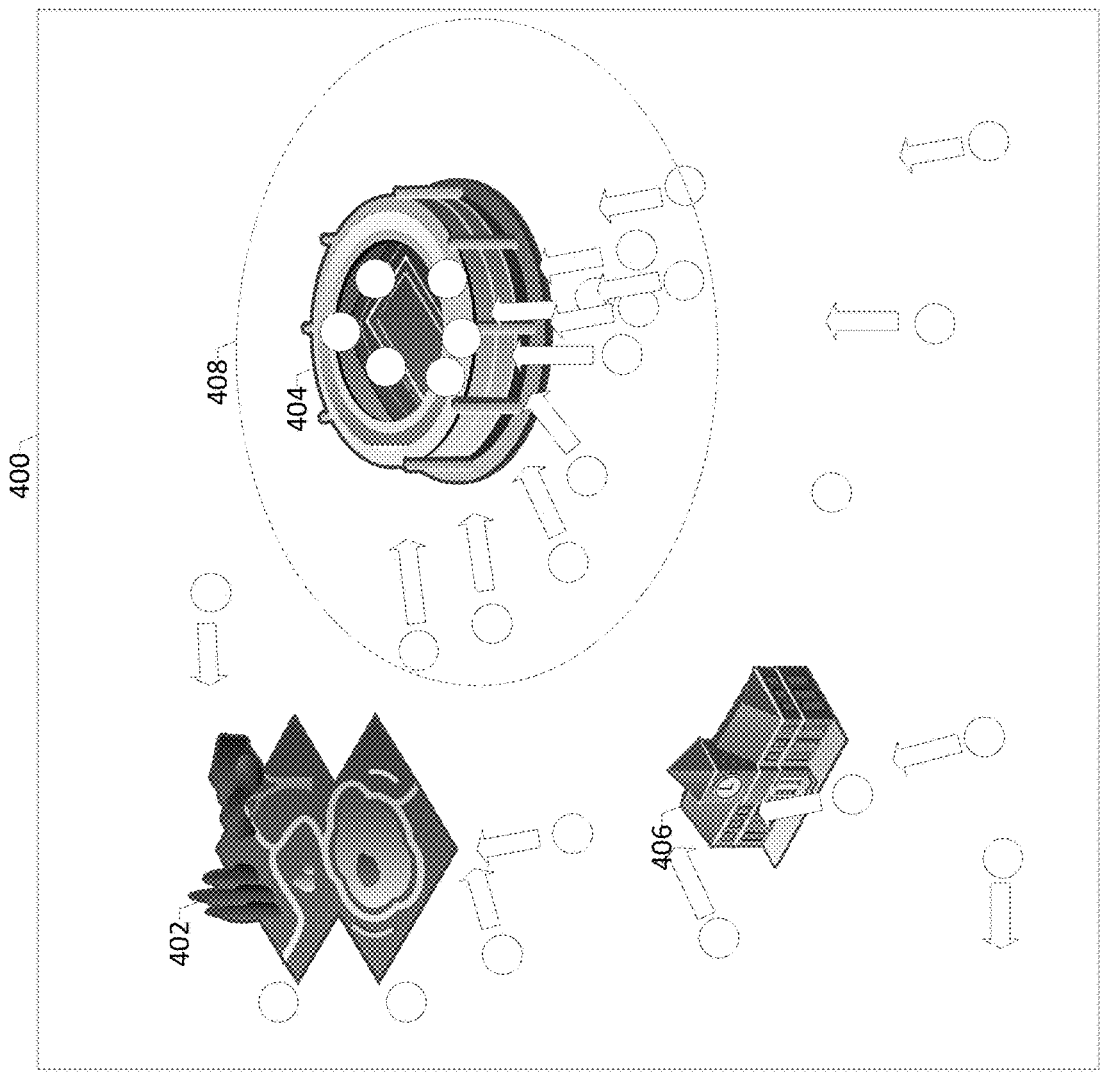
Figure 5:
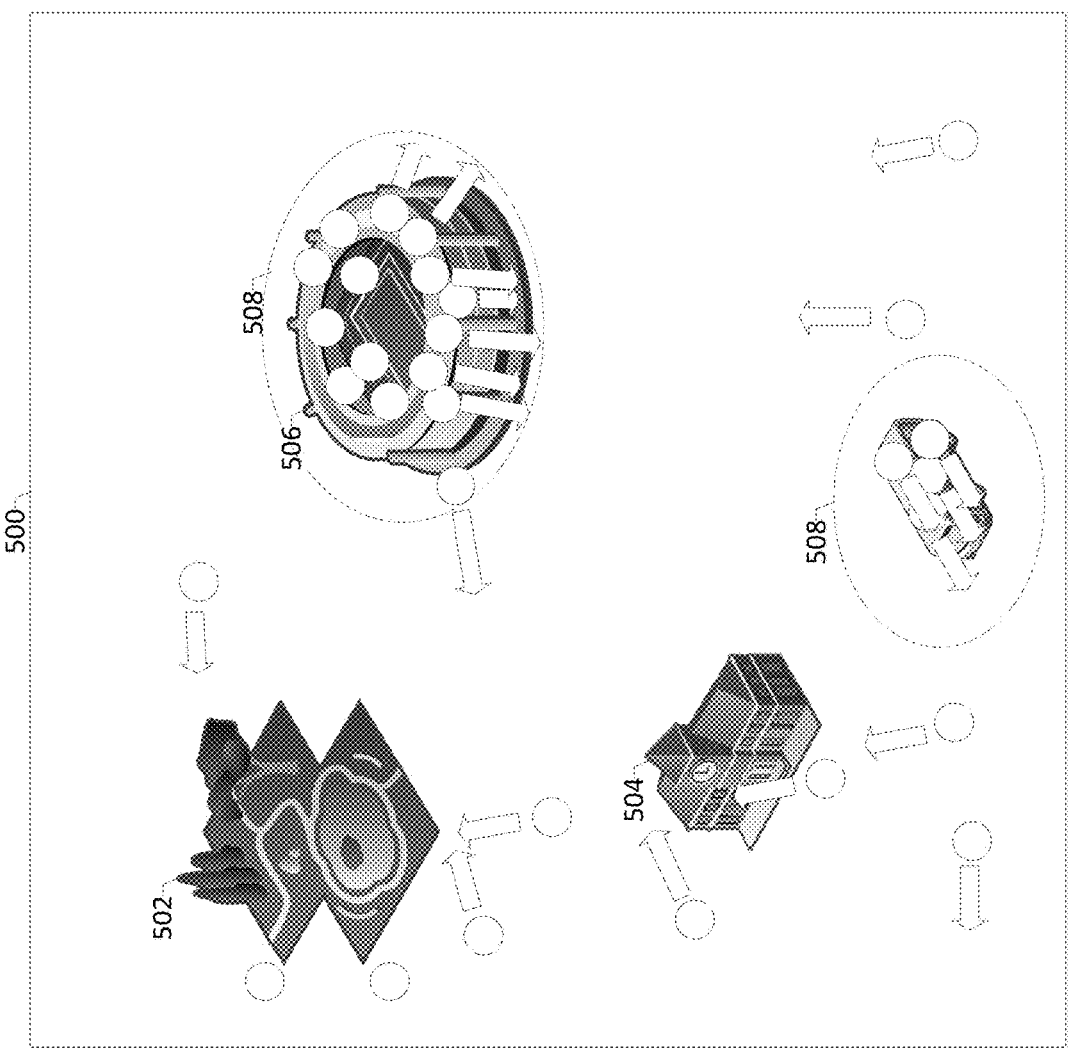
Figure 6:
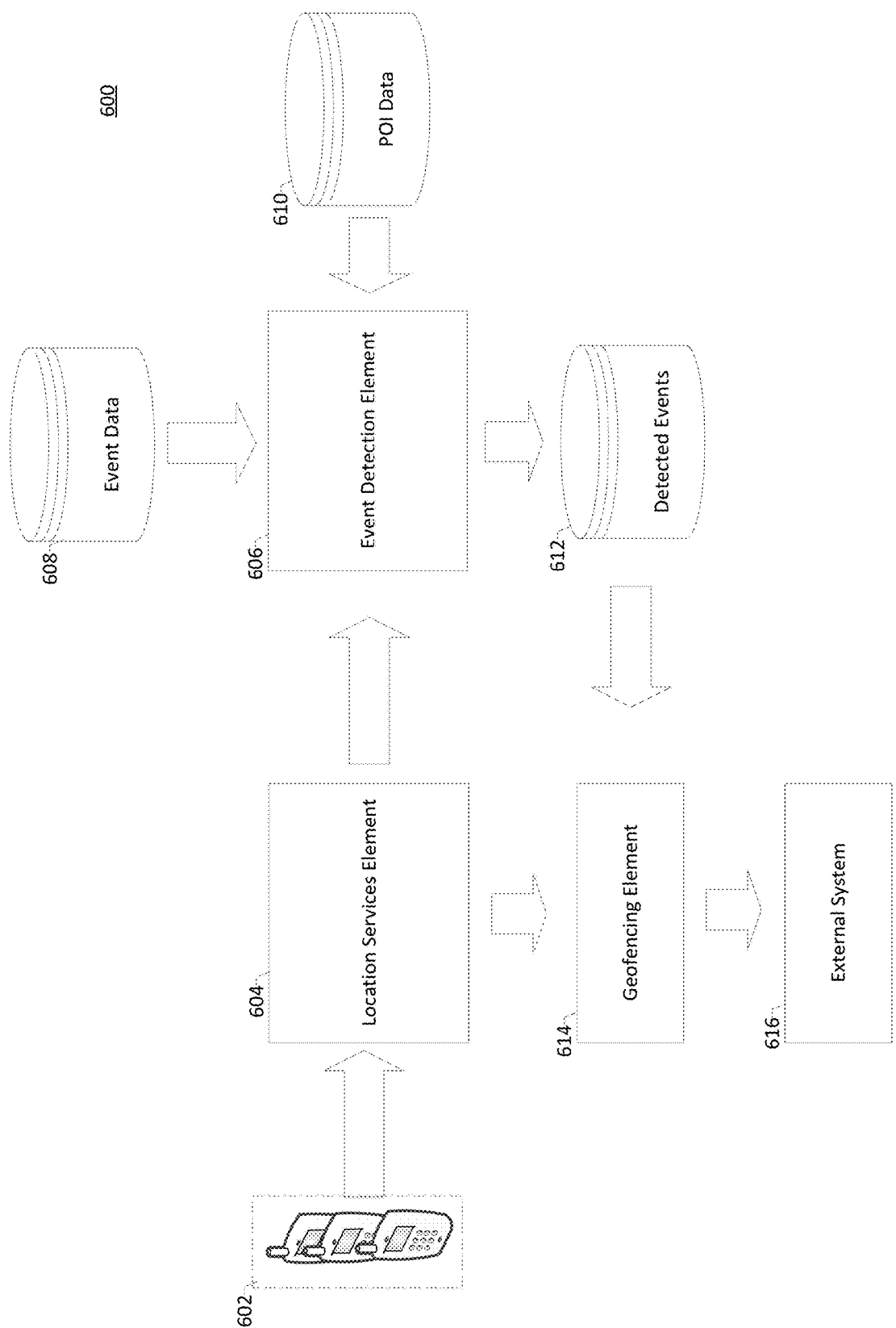
Figure 7:
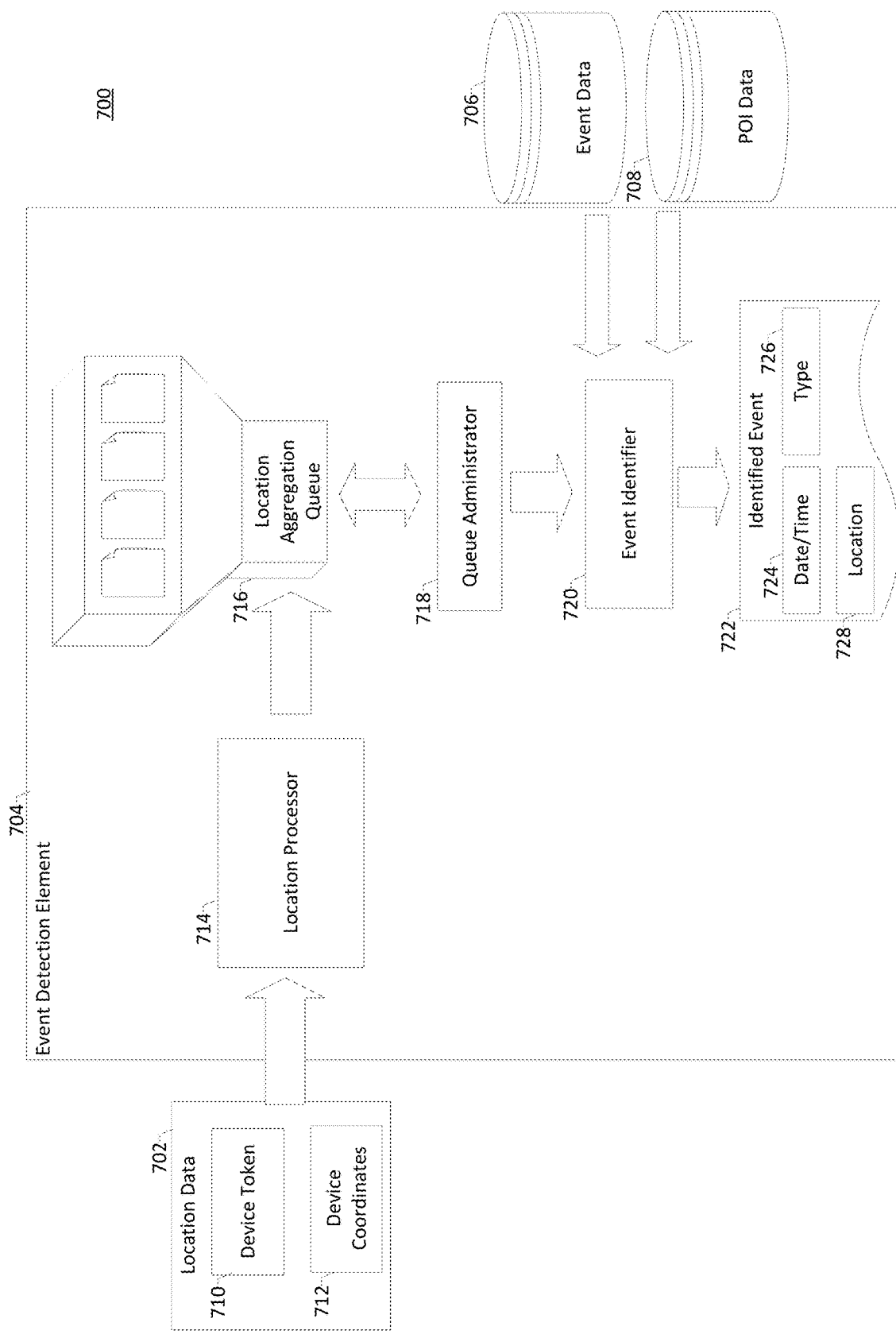
Figure 8:
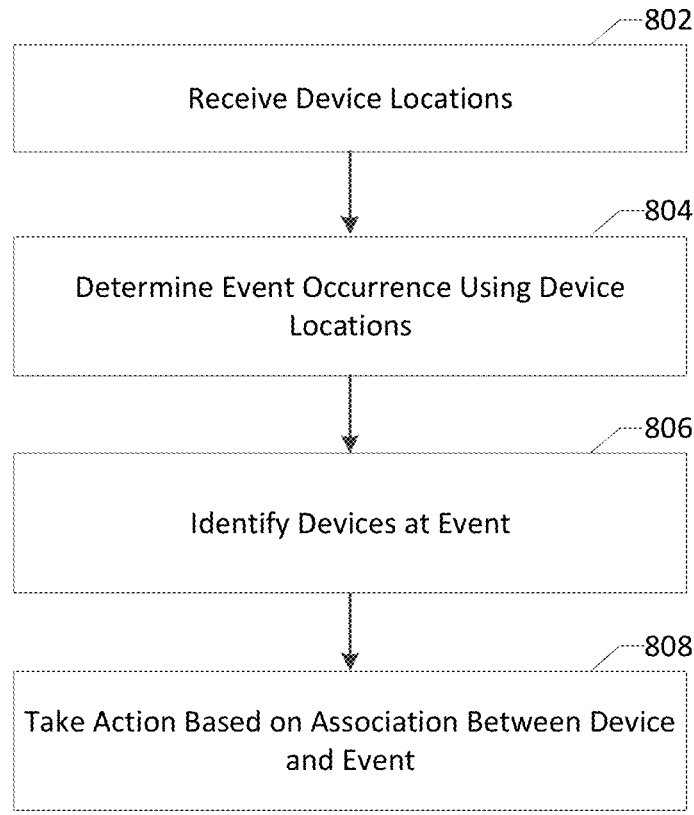
Figure 9:
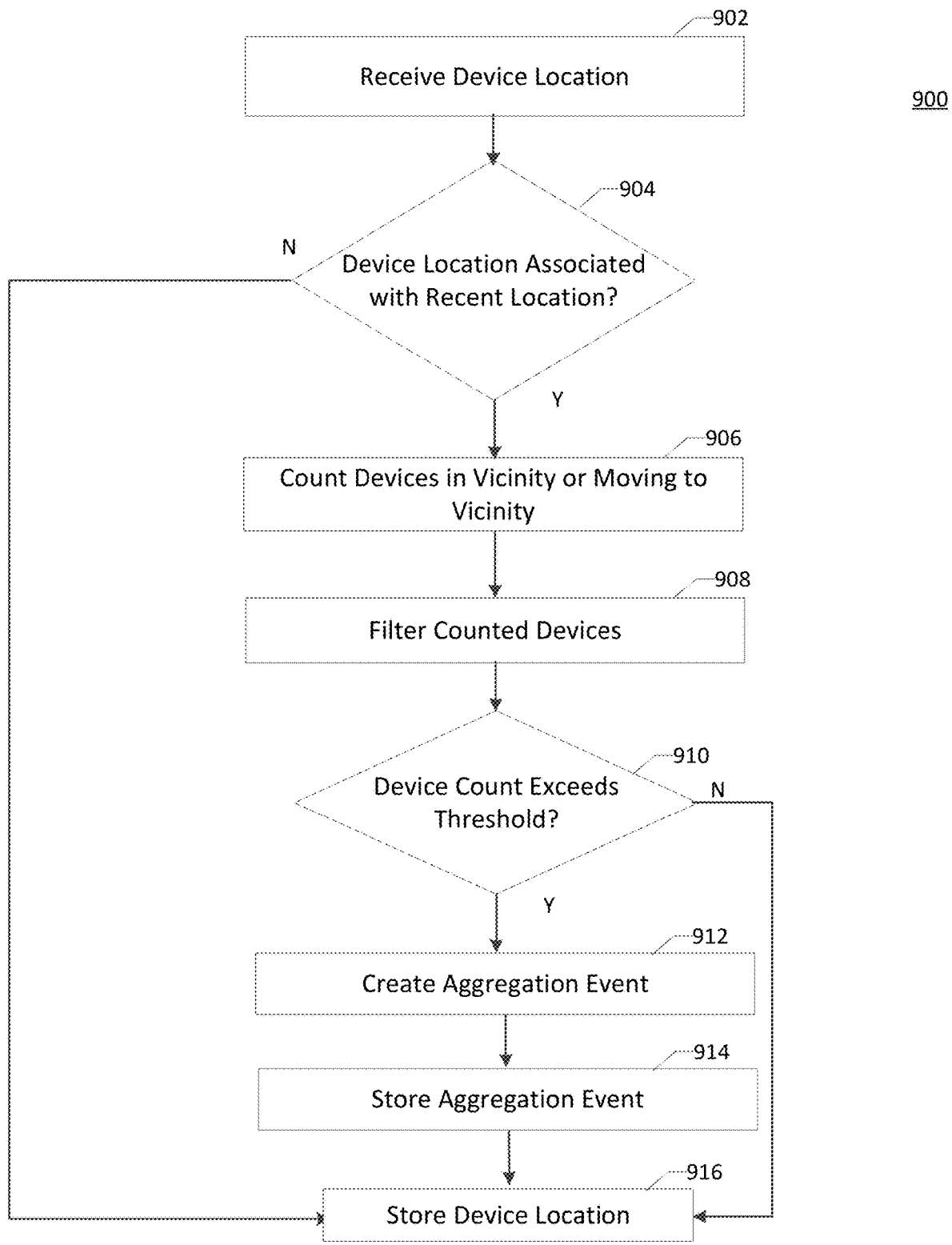
Figure 10:
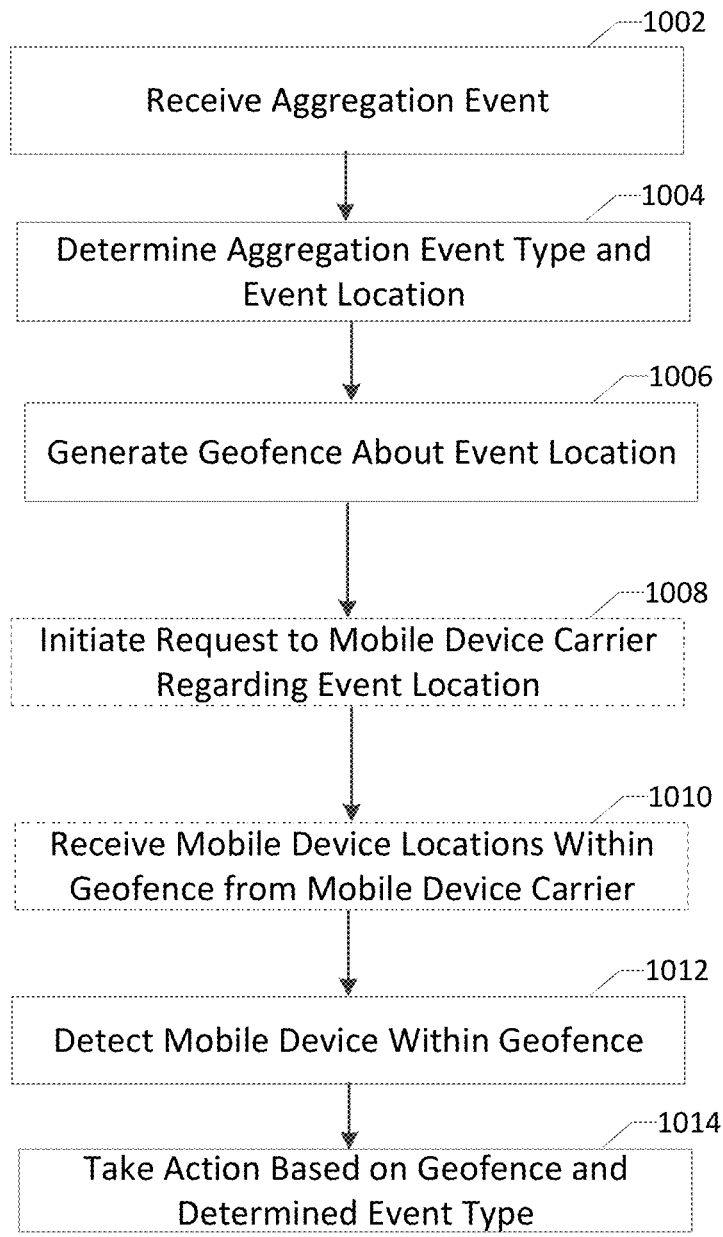

Having thus described certain example embodiments of the present disclosure in general terms, reference will now be made to the accompanying drawings, which are not necessarily drawn to scale, and wherein:

FIG. 1 illustrates an example system within which embodiments of the present invention may operate;

FIG. 2 illustrates a block diagram showing an example device for implementing an event detection system using special-purpose circuitry in accordance with some exemplary embodiments of the present invention;

FIG. 3 illustrates an example data flow among a consumer device, a server, and a merchant device in accordance with some exemplary embodiments of the present invention;

FIG. 4 illustrates an illustration of an example of an event detection process in accordance with some exemplary embodiments of the present invention;

FIG. 5 illustrates an illustration of another example of an event detection process in accordance with some exemplary embodiments of the present invention;

FIG. 6 illustrates an example data flow interaction depicting inputs and outputs among components of a system for detecting events using location services information in accordance with some exemplary embodiments of the present invention;

FIG. 7 illustrates an example of a data flow interaction for using an event detection element to detect events from mobile device location information in accordance with some exemplary embodiments of the present invention;

FIG. 8 illustrates a flow diagram depicting an example of a method for an event detection process in accordance with some exemplary embodiments of the present invention;

FIG. 9 illustrates a flow diagram depicting an example of a method for using an event detection element to identify events in accordance with some exemplary embodiments of the present invention;

FIG. 10 illustrates a flow diagram depicting an example of a method for using a virtual perimeter defined by event detection systems in accordance with some exemplary embodiments of the present invention.

DETAILED DESCRIPTION

Overview

Various embodiments of the present invention are directed to improved apparatuses, methods, and computer readable media for identifying events using location information received from mobile devices. In this regard, embodiments of the present invention provide systems, devices, and frameworks for receiving location information, identifying scenarios where the location information indicates that users are congregating, identifying events based on the manner in which users congregate, and taking action based on those identified events. Embodiments of the present invention provide techniques and algorithms for efficiently evaluating data received from a large number (e.g., hundreds, thousands, tens of thousands, or more) of mobile devices to identify scenarios where those devices are congregating.

Embodiments further describe techniques and processes for utilizing identified events in novel manners. For example, embodiments include techniques for programmatically defining "virtual perimeters" around identified events such that additional mobile devices that enter the virtual perimeter are flagged or otherwise identified as attending the event. Upon detection that a mobile device is at an event, embodiments may generate notifications to transmit to that mobile device based on the event, store user profile data indicating that a user associated with the mobile device attended the event, or the like.

Definitions

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "device rendered object," may include instructions that when executed render the display of a "promotion" on a computing device. Unless otherwise specified, "device rendered object" and "promotion" are used herein interchangeably, that is, where the term "promotion" appears, it is understood to be a "device rendered object" unless otherwise specified. A "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant self-service indicators (defined below) may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including but not necessarily limited to offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like.

As used herein, the terms "electronic marketing communication" and "message" refer to any electronically generated information content provided by the promotion and marketing service to a consumer for the purpose of marketing a promotion, good, or service to the consumer. Electronic marketing communications may include any email, short message service (SMS) message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling or resulting in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

It should be appreciated that the terms "mobile device" and "mobile terminal" refer to handheld computing devices such as cellular phones, personal digital assistants (PDAs), smartphones, and other portable devices that are capable of communicating via a wireless network. Such devices may include internal mechanisms for determining a location of the mobile device (e.g., global positioning system (GPS) receivers, cellular tower triangulation systems, or the like) or external mechanisms for determining the location of the mobile device (e.g., a barcode or other machine-readable code that can be scanned to detect the mobile device, a unique device identifier that is broadcast to a local network device or beacon to report that the device is in proximity, or the like). It should be understood that, while many of the embodiments described herein relate to mobile devices that include internal positioning mechanisms and which directly report the location of the mobile device, some embodiments of the instant invention also include mechanisms that do not rely on the mobile device itself to report the location, and as such these embodiments may be employed in any scenario where it is possible to identify the location of one or more mobile devices.

As used herein, the term "virtual perimeter" refers to a virtual perimeter surrounding a real-world geographic region, such as a circle with a pre-defined radius around one or more mobile devices, an ellipse or the like where at least two mobile devices are focal points, an area enclosing a particular neighborhood or portion thereof that contains one or more mobile devices, or a polygonal boundary defined to encapsulate a specifically defined area (ZIP codes, delivery zones, etc.) and the like. A virtual perimeter can be dynamically generated or a virtual perimeter can be a predefined set of boundaries. A virtual perimeter is defined using a set of latitudinal and longitudinal coordinates.

As used herein, the term "event" refers to an organized occurrence at a particular time and place. An event may have associated with it a title, a theme, a duration of time, guests, or other attributes. An event may further be perceivable virtually by a collection of information which is being publicly published and/or shared by a group of individuals in public forums. For example, a user of a mobile device may post an update via Twitter® indicating an incident is occurring at a particular intersection. Based upon other updates via social media, it can be determined that an event is taking place at the particular intersection.

Technical Underpinnings and Implementation of Exemplary Embodiments

Merchants, including manufacturers, wholesalers, and retailers, have spent a tremendous amount of time, money, manpower, and other resources to determine the best way to market their products to consumers. Whether a given marketing effort is successful is often determined based on the return-on-investment offered to the merchant from increased awareness, sales, and the like of the merchant's goods and services in exchange for the resources spent on the marketing effort. In other words, optimal marketing techniques generally maximize the benefit to the merchant's bottom line while minimizing the cost spent on marketing. To this end, a merchant's marketing budget may be spent in a variety of different manners including advertising, offering of discounts, conducting market research, and various other known marketing techniques. The end goal of these activities is to ensure that products are presented to consumers in a manner that maximizes the likelihood that the consumers will purchase the product from the merchant that performed the marketing activities while minimizing the expense of the marketing effort.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the marketing and sales process. As a result, new technologies have been developed to gather, aggregate, analyze, and report information from a variety of electronic sources.

So-called "clickstream data" provides a robust set of information describing the various interactions consumers have with electronic marketing communications provided to them by merchants and others. Promotion and marketing services have been developed with sophisticated technology to receive and process this data for the benefit of both merchants and consumers. These services assist merchants with marketing their products to interested consumers, while reducing the chance that a consumer will be presented with marketing information in which the consumer has no interest. Some promotion and marketing services further leverage their access to a trove of electronic marketing information to assist merchants and consumers with other tasks, such as offering improved merchant point-of-sale systems, improved inventory and supply chain management, improved methods for delivering products and services, and the like.

Unlike conventional marketing techniques related to the use of paper or other physical media (e.g., coupons clipped from a weekly newspaper), promotion and marketing services offer a wealth of additional electronic solutions to improve the experience for consumers and merchants. The ability to closely monitor user impressions provides the ability for the promotion and marketing service to gather data related to the time, place, and manner in which the consumer engaged with the impression (e.g., viewed, clicked, moused-over) and obtained and redeemed the promotion. The promotion and marketing service may use this information to determine which products and services are most relevant to the consumer's interest, and to provide marketing materials related to said products and services to the consumer, thus improving the quality of the electronic marketing communications received by the consumer. Merchants may be provided with the ability to dynamically monitor and adjust the parameters of promotions offered by the promotion and marketing service, ensuring that the merchant receives a positive return on their investment. For example, the merchant can closely monitor the type, discount level, and quantity sold of a particular promotion on the fly, while with traditional printed coupons the merchant would not be able to make any changes to the promotion after the coupon has gone to print. Each of these advancements in digital market and promotion distribution involve problems unique to the digital environment not before seen in traditional print or television broadcast marketing.

However, these promotion and marketing services are not without problems. Although electronic marketing information provides a wealth of information, the inventors have determined that existing techniques may not always leverage this information in an efficient or accurate manner. Technology continues to rapidly advance in the field of analytics and the processing of this information, offering improved data gathering and analysis techniques, resulting in more relevant and accurate results provided in a more efficient manner. Electronic marketing services continue to evolve and provide improved methods for engaging consumers and spreading awareness of products offered by promotion and marketing services.

In many cases, the inventors have determined that these services are constrained by technological obstacles unique to the electronic nature of the services provided, such as constraints on data storage, machine communication and processor resources. The inventors have identified that the wealth of electronic marketing information available to these services and the robust nature of electronic marketing communications techniques present new challenges never contemplated in the world of paper coupons and physical marketing techniques. The inventors have further determined that even technological methods that leverage computers for statistical analysis and consumer behavior modeling (e.g., television rating systems) fail to address problems associated with providing relevant, high quality electronic marketing communications (e.g., impressions) to consumers in a manner that maximizes accuracy, minimizes error, is user friendly and provides for efficient allocation of resources. Embodiments of the present invention as described herein serve to correct these errors and offer improved resource utilization, thus providing improvements to electronic marketing services that address problems arising out of the electronic nature of those services.

As market penetration of smartphones and other such mobile devices has increased, it has become increasingly common for consumers to have access to devices that provide the ability to detect and report the consumer's location. By using certain applications that determine the consumer's location and electing to provide such location data to external users, consumers may receive a variety of benefits tailored to their particular location. For example, a variety of applications exist that leverage the ability to know the location of the consumer and provide specially-tailored coupons, discounts, notifications, and the like. However, systems that leverage the ability to target location-based electronic marketing communications and other notifications are still quite rudimentary, relying on hard-coded detection of proximity to particular points of interest. For example, a given system may detect the presence of a consumer near a particular store, and offer a coupon for that store via a notification sent to the user's mobile device. However, such systems are incapable of detecting ad hoc or temporary events (e.g., parades, fairs), or disambiguating between events at venues that may host a variety of types of events (e.g., a football stadium that hosts both football games and concerts, or a concert hall that hosts both standup comedians and musicians). Although systems have been developed that allow administrators to "hard code" such events as occurring at a particular time or place, these systems require manual entry of event types, associated locations, and associated actions to be taken related to that event.

The inventors have recognized that, by leveraging access to a set of location information provided by a plurality of mobile devices, it is possible to implement systems and methods that programmatically detect when consumers are congregating in a particular area. In response to detecting a congregation of consumers in an area, the systems and methods programmatically identify an event as occurring. These systems and methods may be further operable to identify an event venue and type using other data sources, such as event catalogues, venue websites, or the like. Once an event is detected, embodiments may establish a virtual perimeter about the event to identify other consumers attending the event, and take appropriate actions based on the presence of the consumers at the event.

Upon implementing a system for detection of events as described herein, the inventors further have realized that retrieving a multitude of sets of location information from a large number of mobile terminals requires a substantial amount of processing resources, since identifying consumers congregating in an arbitrary location involves comparing received locations with other received locations, presenting certain issues regarding scaling as the number of mobile terminals providing location data increases. The inventors have developed novel algorithms and processing techniques for addressing these issues, including implementation of a queue structure as part of the event detection process, thereby providing an efficient mechanism for comparing locations to one another to identify scenarios where consumers appear to be congregating.

The inventors have additionally realized that it is possible to leverage access to certain wireless carrier services to improve the process by which events are detected. For example, some wireless carriers include the ability for users to allow certain application developers to request location or other information from their mobile devices even when those mobile devices are not executing an application associated with the application developer. As a particular example, a consumer may select an option that allows the application developer to, via the wireless carrier, "ping" the consumer's mobile device to obtain location information. While such information would typically be provided directly from the mobile device to the application developer via execution of the application on the mobile device, the consumer may prefer to not allow that application to access location information when executing as a background process in order to reduce battery consumption. Embodiments of the present invention may thus interface with wireless carrier systems to request location information from such consumers in scenarios where it is determined that the consumer is likely to be present at a particular event, thereby providing the advantage of reduced battery consumption of the mobile terminal (e.g., due to the fact that the local application is not actively providing location data), while still providing the benefits of targeted notifications based on detection that the user is near an event.

Additionally, by storing information related to detected events, the inventors have recognized that it is possible to programmatically predict future events. For example, the inventors have recognized that by monitoring the events associated with particular venues or other points of interest, the dates and times of these detected events may be used to determine the frequency of such events. For example, a football stadium may have games most frequently on Sundays during the fall and winter. By monitoring when these events occur, the system may be able to predict future events. Furthermore, by identifying event types and associations with particular days and times, embodiments may predict the event type of future events as they occur, based on which previous events have occurred at the same or similar venues on particular days or times.

System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Merchants may access a promotion and marketing service 102 via a network 112 (e.g., the Internet, or the like) using computer devices 108A through 108N and 110A through 110N, respectively (e.g., one or more consumer devices 108A-108N or one or more merchant devices 110A-110N). The promotion and marketing service 102 may function to detect events based on consumer location information as described herein and below. Moreover, the promotion and marketing service 102 may comprise a server 104 in communication with a database 106.

The server 104 may be embodied as a computer or computers as known in the art. The server 104 may provide for receiving of electronic data from various sources, including but not necessarily limited to the consumer devices 108A-108N and the merchant devices 110A-110N. For example, the server 104 may be operable to receive and process clickstream data provided by the consumer devices 108 and/or the merchant devices 110. The server 104 may also facilitate e-commerce transactions based on transaction data provided by the consumer devices 108 and/or the merchant devices 110. The server 104 may facilitate the generation and providing of various electronic marketing communications and marketing materials based on the received electronic marketing information.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include, without limitation, user account credentials for system administrators, merchants, and consumers, data indicating the products and promotions offered by the promotion and marketing service, electronic marketing information, analytics, reports, financial data, and/or the like.

The consumer devices 108A-108N may be any computing device as known in the art and operated by a consumer. Electronic data received by the server 104 from the consumer devices 108A-108N may be provided in various forms and via various methods. For example, the consumer devices 108A-108N may include desktop computers, laptop computers, smartphones, netbooks, tablet computers, wearables, and the like. The information may be provided through various sources on these consumer devices.

In embodiments where a consumer device 108 is a mobile device, such as a smart phone or tablet, the consumer device 108 may execute an "app" to interact with the promotion and marketing service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8® and Windows 10®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing service 102 may leverage the application framework offered by the mobile operating system to allow consumers to designate which information is provided to the app and which may then be provided to the promotion and marketing service 102. In some embodiments, consumers may "opt in" to provide particular data to the promotion and marketing service 102 in exchange for a benefit, such as improved relevancy of marketing communications offered to the user. In some embodiments, the consumer may be provided with privacy information and other terms and conditions related to the information provided to the promotion and marketing service 102 during installation or use of the app. Once the consumer provides access to a particular feature of the mobile device, information derived from that feature may be provided to the promotion and marketing service 102 to improve the quality of the consumer's interactions with the promotion and marketing service.

For example, the consumer may indicate that they wish to provide location information to the app from location services circuitry included in their mobile device. Providing this information to the promotion and marketing service 102 may enable the promotion and marketing service 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing service 102. For example, the consumer may decide at a later point to disable the ability of the app to access the location services circuitry, thus limiting the access of the consumer's location information to the promotion and marketing service 102.

As noted above, some wireless carriers may also provide consumers with the ability to "opt in" to allowing certain application developers to request mobile device location information directly from the wireless carrier (e.g., a location derived from which cellular tower or towers with which the mobile device is in communication) without the need to directly contact the mobile terminal. Such embodiments may advantageously reduce the amount of mobile device battery life required to receive location-based notifications while still providing benefits derived from the ability to determine when the consumer is at a particular event as described herein.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion or to indicate that the consumer has been detected at a particular event. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the promotion and marketing service 102 via a web browser. As yet another example, the consumer device 108 may include various hardware or firmware designed to interface with the promotion and marketing service 102 (e.g., where the consumer device 108 is a purpose-built device offered for the primary purpose of communicating with the promotion and marketing service 102, such as a store kiosk).

The merchant devices 110A-110N may be any computing device as known in the art and operated by a merchant. For example, the merchant devices 110A-110N may include a merchant point-of-sale, a merchant local marketing device, a merchant e-commerce server, a merchant inventory system, or a computing device accessing a web site designed to provide merchant access (e.g., by accessing a web page via a browser using a set of merchant account credentials). The merchant devices 110A-110N may also be mobile devices as described above with respect to the consumer devices 108A-108N.

Electronic data received by the promotion and marketing service 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotion and marketing service 102 to enable the promotion and marketing service 102 to generate promotions or other marketing information to be provided to consumers.

An example of a data flow for exchanging electronic marketing information among one or more consumer devices, merchant devices, and the promotion and marketing service is described below with respect to FIG. 3.

Example Apparatuses for Implementing
Embodiments of the Present Invention

The server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, location services circuitry 210, event detection circuitry 212, virtual perimeter generating circuitry 214, and application circuitry 216. The apparatus 200 may be configured to execute the operations described above with respect to FIG. 1 and below with respect to FIGS. 4-10. Although these components 202-216 are described with respect to functional limitations, it should be understood that the particular implementations necessarily include the use of particular hardware. It should also be understood that certain of these components 202-216 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or coprocessor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The location services circuitry 210 includes hardware configured to receive or determine a location of a plurality of mobile devices. The location services circuitry 210 may include an interface for communicating with the mobile devices over a network. Such an interface may be provided by the communications circuitry 208. The location services circuitry 210 may include a network interface that receives location information reported by the mobile device via an application and location services module located on the mobile device itself. Additionally or alternatively, the location services circuitry 210 may include an interface to a wireless carrier or other third party system capable of providing location information for one or more mobile terminals. Additionally or alternatively, the location services circuitry 210 may also include hardware configured to determine the location of the one or more mobile terminals based on received data. For example, the location services circuitry 210 may include hardware configured to determine the location of the mobile terminal based on data indicating which wireless stations (e.g., wireless access points or cellular towers) with which the mobile terminal is in communication. Upon receiving a location or locations of a mobile terminal or terminals, the location services circuitry 210 may notify the event detection circuitry 212 of the location. This notification may occur via an application programming interface (API), shared memory, bus, or the like. In some embodiments, the location services circuitry 210 may be implemented as a component of the event detection circuitry 212, and the location information may be communicated internally to the consolidated module. The location services circuitry 210 may include a separate processor to receive and/or determine the location of mobile terminals. The location services circuitry 210 is therefore implemented using hardware components of the apparatus configured by either hardware or software for implementing these planned functions.

The event detection circuitry 212 includes hardware configured to identify locations at which a number of mobile terminals are congregating, and to determine whether that congregation of mobile terminals is likely to indicate the presence of an event. The event detection circuitry 212 may further be configured to identify a venue associated with an event, and an event type associated with the event. To perform these determinations, the event detection circuitry 212 implements one or more process threads and algorithms to receive mobile terminal locations, to determine if those locations are associated with any recently received locations, to filter received locations based on a density of consumers and/or a velocity of those consumers, to identify locations where more than a threshold number of consumers are detected after a filtering operation, and to determine a location and type of an event when greater than the threshold number of consumers are detected.

Upon detecting an event, one or more of an identifier for the event, a location of the event, and a type of the event may be forwarded to the virtual perimeter generating circuitry 214 for establishing a virtual perimeter about the event. Processes and data flows for implementing such event detection circuitry are described further below with respect to FIGS. 4-10. It should also be appreciated that, in some embodiments, the event detection circuitry 212 may include a separate processor or the like to generate one or more electronic marketing communications. The event detection circuitry 212 may also include a storage mechanism, such as the memory 204, for storing received mobile terminal locations, storing values related to counting of mobile terminal locations about a particular location, storing detected events, and the like. The event detection circuitry 212 is therefore implemented using hardware components of the apparatus configured by either hardware or software for implementing these planned functions.

The virtual perimeter generating circuitry 214 includes hardware configured to authorize the transmission of electronic marketing communications to consumers. To this end, the virtual perimeter generating circuitry 214 may identify a geographic area or range of coordinate values that correspond to the event, such that mobile devices that are detected within the geographic area or range of coordinate values are indicated as being present at the event. The location services circuitry 210 may provide the virtual perimeter generating circuitry 214 with locations of mobile terminals in order to determine if those mobile terminals are within the virtual perimeter. Upon detection of a mobile terminal within the virtual perimeter, the virtual perimeter generating circuitry 214 may notify the application circuitry 216, so that the application circuitry 216 may take appropriate action. The virtual perimeter generating circuitry 214 includes processing circuitry, such as the processor 202, configured to perform these functions. The virtual perimeter generating circuitry 214 also includes data storage, such as the memory 204, to store and access relevant data including storage of events, event types, corresponding virtual perimeters, and the like. The virtual perimeter generating circuitry 214 is therefore implemented using hardware components of the apparatus configured by either hardware or software for implementing these planned functions.

The application circuitry 216 includes hardware configured to take particular actions upon detection of a mobile terminal at a location associated with an event defined by the event detection circuitry 212. As noted above, events detected by the event detection circuitry 212 may have associated virtual perimeters established by the virtual perimeter generating circuitry 214. Virtual perimeter generating circuitry 214 generates a virtual perimeter by storing a plurality of latitude/longitude pairs in an array or table. The plurality of latitude/longitude pairs defines a virtual perimeter around a geographic area, and can be in any shape as described above. The system determines that a mobile device is within a virtual perimeter by receiving the latitude/longitude pair associated with the location of the mobile device and comparing the pair to those stored in the array or table. The system can determine that a large plurality of mobile devices, that are constantly moving, are within the virtual perimeter or moving toward or away from the virtual perimeter using the latitude/longitude pairs of the array or table as well as those of the large plurality of mobile devices. The system can further determine a mode of transportation utilized by a mobile device that is identified as traveling toward the virtual perimeter by utilizing a series of latitude/longitude pairs as well as other data including velocity, directional data, and the like using sensors within or around the mobile device.

When the system determines that a mobile device has been detected within or moving toward a virtual perimeter associated with an event, the application circuitry 216 may be notified of the mobile terminal and the particular event at which that mobile terminal was detected. The application circuitry 216 may implement various functions based on the detection of the mobile terminal at the event. For example, in some embodiments, the application circuitry 216 may generate a notification or other electronic marketing communication to the mobile terminal upon being notified that the mobile terminal is located at the event. This electronic marketing communication may include a promotion associated with the particular event (e.g., a discount at a concession stand), a promotion associated with an event type (e.g., a discount associated with an album by a musician performing at the event), a promotion associated with the event venue (e.g., season passes for a symphony performing at the event venue), a promotion associated with a nearby merchant (e.g., make reservations at this local restaurant for after the game) or the like.

In other embodiments, the application circuitry 216 may update a user profile or set of consumer data in response to the detection of the consumer at the event. For example, in response to detecting that the consumer is at a professional football game, the application circuitry 216 may update a stored consumer profile to indicate that the consumer is likely a fan of one of the teams playing at the game. Such consumer profiles may be used in future operations relating to identification of relevant materials for transmission to the consumer. As another example of the functionality of the application circuitry 216, the application circuitry 216 may generate a profile for the particular event or event venue based on the consumers present at the event. For example, instead of updating a consumer profile with information derived from the event, the event type may be updated with information about the particular consumers that attended to identify correlations and commonalities. This may result in information such as "consumers attending this event have a particular interest in country music" or "consumers attending this event are mostly men between the ages of 18 and 34". It should be appreciated that embodiments of the present invention may provide a variety of different use cases and improved systems that utilize dynamically detected events, and that embodiments of the invention should not necessarily be limited to the specific cases enumerated herein for utilizing information relating to the identification of consumers at detected events.

The application circuitry 216 may include processing circuitry, such as the processor 202, configured to perform these functions. It should also be appreciated that, in some embodiments, the application circuitry 216 may include a separate processor, networking circuitry, protocols, and messaging techniques to implement a variety of functions relating to using dynamically detected events, including but not limited to functions of a promotion and marketing service, an email or text message notification system, or the like. The application circuitry 216 is therefore implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by example displays described herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Electronic Marketing Information Service Data Flow

FIG. 3 depicts an example data flow 300 illustrating interactions between a server 302, one or more consumer devices 304, and one or more merchant devices 306. The server 302 may be implemented in the same or a similar fashion as the server 104 as described above with respect to FIG. 1 and/or the apparatus 200 described above with respect to FIG. 2, the one or more consumer devices 304 may be implemented in the same or a similar fashion as the consumer devices 108A-108N as described above with respect to FIG. 1, and the one or more merchant devices 306 may be implemented in the same or a similar fashion as the merchant devices 110A-110N as described above with respect to FIG. 1.

The data flow 300 illustrates how electronic information may be passed among various systems when employing a server 302 in accordance with embodiments of the present invention. The one or more consumer devices 304 and/or one or more merchant devices 306 may provide a variety of electronic marketing information to the server 302 for use in providing promotion and marketing services to the consumer. This electronic marketing information may include, but is not limited to, location data, clickstream data, transaction data, communication channel data, and/or discretionary data.

As a result of transactions performed between the one or more consumer devices 304 and the server 302, the server 302 may provide fulfillment data to the consumer devices. The fulfillment data may include information indicating whether the transaction was successful, the location and time the product will be provided to the consumer, instruments for redeeming promotions purchased by the consumer, or the like.

In addition to the e-commerce interactions with the one or more consumer devices 304 offered by the server 302, the server 302 may leverage information provided by the consumer devices to improve the relevancy of electronic marketing communications to individual consumers or groups of consumers. In this manner, the server 302 may determine promotions, goods, and services that are more likely to be of interest to a particular consumer or group of consumers based on clickstream data, location data, and other information provided by and/or relating to particular consumers. For example, the server 302 may detect the location of a consumer based on location data provided by the consumer device, and offer promotions based on the proximity of the consumer to the merchant associated with those promotions. Alternatively, the server 302 may note that the consumer has an interest in a particular hobby (e.g., skiing) based on electronic marketing information associated with the consumer (e.g., a browser cookie that indicates they frequently visit websites that provide snowfall forecasts for particular ski resorts), and offer promotions associated with that hobby (e.g., a promotion offering discounted ski equipment rentals or lift tickets). It should be appreciated that a variety of different types of electronic marketing information could be provided to the server 302 for the purpose of improving the relevancy of marketing communications. It should also be appreciated that this electronic marketing information may be received from a variety of electronic sources, including various consumer devices, merchant devices, and other sources both internal and external to a promotion and marketing service. For example, other data sources may include imported contact databases maintained by merchants, electronic survey questions answered by consumers, and/or various other forms of electronic data.

It should also be appreciated that the server 302 may also control other factors of the electronic marketing communications sent to the consumer other than the particular promotions included in the electronic marketing communication. For example, the server 302 may determine the form, structure, frequency, and type of the electronic marketing communication. As with the content of the electronic marketing communication, these factors may be programmatically determined according to various methods, factors, and processes based on electronic data received by the server 302 for the purpose of maximize the likelihood that the communication will be relevant to the recipient consumer.

The server 302 interactions with the one or more merchant devices 306 may be related to enabling the merchant to market their products using a promotion and marketing service. For example, the one or more merchant devices 306 may provide promotion data defining one or more promotions to be offered by the promotion and marketing service on behalf of the merchant. The server 302 may receive this information and generate information for providing such promotions via an e-commerce interface, making the promotions available for purchase by consumers. The server 302 may also receive information about products from the one or more merchant devices 306. For example, a merchant may provide electronic marketing information indicating particular products, product prices, inventory levels, and the like to be marketed via a promotion and marketing service. The server 302 may receive this information and generate listing information to offer the indicating products to consumers via a promotion and marketing service.

The one or more merchant devices 306 may also receive information from the server 302. For example, in some embodiments a merchant may obtain access to certain business analytic data aggregated, generated, or maintained by the server 302. As a particular example, a merchant might offer to pay for consumer demographic data related to products or services offered by the merchant. It should be appreciated however, that a merchant may not need to list any products or services via the promotion and marketing service in order to obtain such data. For example, the promotion and marketing service may enable merchants to access electronic marketing data offered via the promotion and marketing service based on a subscription model.

The one or more merchant devices 306 may also receive electronic compensation data from the server 302. For example, when a promotion or product is sold by the promotion and marketing service on behalf of the merchant, a portion of the received funds may be transmitted to the merchant. The compensation data may include information sufficient to notify the merchant that such funds are being or have been transmitted. In some embodiments, the compensation data may take the form of an electronic wire transfer directly to a merchant account. In some other embodiments, the compensation data may indicate that a promotion or product has been purchased, but the actual transfer of funds may occur at a later time. For example, in some embodiments, compensation data indicating the sale of a promotion may be provided immediately, but funds may not be transferred to the merchant until the promotion is redeemed by the consumer.

Embodiments advantageously provide for improvements to the server 302 by providing improved location services techniques for receiving and processing of location data from the consumer devices 304. In this manner, embodiments offer improved techniques for identifying congregations of consumers from received location information, processing received locations to identify events, and determining event types. Embodiments further provide for determining when consumer devices are detected at particular events, and leveraging event-related information to improve the process by which the server 302 communicates with the consumer devices 304 and the merchant devices 306.

Illustration of Exemplary Event Detection Operation

FIG. 4 depicts an illustration 400 of an exemplary event detection process in accordance with embodiments of the present invention. The illustration 400 depicts a number of points of interest 402, 404, 406, and a number of detected mobile devices, depicted as circles in the illustration. The illustration 400 also depicts movement of some of the mobile devices, represented as arrows denoting a movement vector for the mobile device.

Each of the mobile devices may report location information to a remote server at certain intervals, or on demand. For example, mobile devices may report a location every 5 minutes, every 10 minutes, or every hour. In some embodiments, location reporting may be based upon execution of a particular application, such as a mobile application provided by an application developer. This application may access location information stored on the mobile device or utilize location services circuitry (e.g., a GPS receiver) on the mobile device to determine a location and report that location to a remote server associated with the application. The ability of the application to perform this functionality may be as a result of a user of the mobile device "opting in" to enable access to the location information by the mobile device. The movement vector for each of the mobile devices may be reported to a server by the mobile device, or the server may determine the movement vector based in a change in location over multiple location readings.

As depicted in the illustration 400, a series of mobile devices are located proximate to the points of interest 402, 404, 406. Embodiments of the invention are capable of detecting whether an event is occurring (whether at a particular point of interest or in a space not associated with any point of interest) based on the proximity of mobile devices to a particular location, the density of mobile devices about that particular location, and the velocity of mobile devices near that particular location. For example, as depicted in FIG. 4, a number of devices are depicted as present at and moving towards the stadium point of interest 404. Embodiments of the present invention may serve to count the number of mobile devices detected proximate to a location associated with the stadium 404, and determine that devices entering the stadium tend to stay within the stadium. In response, embodiments may identify the stadium as likely to be holding a particular event. Particular processes and algorithms for determining whether an event is occurring are described further below with respect to FIGS. 6-10.

In some embodiments, detecting devices moving towards an event (e.g., stadium point of interest or other identified event) further comprises determining a mode of transportation utilized by the devices moving towards the event. This is particularly useful in further refining promotion selection for the detected devices because the user of a mobile device traveling on a bus or train to an event may not be able to transport large or bulky items to or from the event.

In response to detecting an event, a virtual perimeter 408 about the area in which the event was detected may be established. This virtual perimeter 408 may be employed to identify other mobile devices entering the event. For example, mobile devices entering the virtual perimeter 408 may be identified as attending an event occurring at the stadium 404. It should be appreciated that more than merely breaching the virtual perimeter 408 may be required in some embodiments in order to register a mobile device as attending the event. For example, some embodiments may require that the mobile device remain within the virtual perimeter 408 for at least a threshold period of time, or require that the velocity of the mobile device drop below a threshold value after breaching the virtual perimeter 408. In some embodiments, other criteria may also be employed. For example, the system may verify that the owner of the mobile device breaching the virtual perimeter 408 is not an employee of the venue hosting the event by interfacing with an employee directory.

FIG. 5 depicts an illustration 500 of additional types of events and mechanisms for detecting events. The illustration 500 depicts the points of interest 502, 504, 506 corresponding to elements 402, 404, and 406 of FIG. 4. However, as illustrated in FIG. 5, the mobile devices attending the event at the stadium are dispersing from the stadium 506. Embodiments may be capable of detecting such dispersion (e.g., breaching a virtual perimeter 508 from the interior), and using such dispersion to determine when the event has concluded. An event may be identified as concluded when a threshold number of mobile devices have departed the event location. This threshold may be determined dynamically based on the number of devices detected as present (e.g., when at least 40% of detected devices have departed the virtual perimeter). In some embodiments, events may have additional criteria for determining the end of an event based upon the type of event. For example, if the detected event is a basketball tournament, predefined rules may indicate that the event has multiple individual games, such that the event will not be identified as concluded if the dispersion of users corresponds to an intermission between games.

Embodiments may further detect travel of one or more mobile devices in concert with one another, such as via the depicted bus 508. The mobile devices identified as moving in concert with one another may be identified as traveling together. Based on the number of devices detected proximate to one another and the route of those devices moving in concert with one another, embodiments may identify the particular route traveled by those devices and the mode of transport. For example, embodiments may identify a group of mobile devices as likely traveling by bus if a large number are moving in concert with one another and their location corresponds to major roadways. Similarly, if the group is moving along a route associated with a rail line, then the group may be identified as traveling by rail.

Subsequent to identifying a group of mobile devices traveling in concert with one another, some embodiments may attempt to predict a route for those mobile devices based on the mode of transport and other knowledge related to those users, such as an event which the users were departing. Embodiments may identify merchants or other points of interest along the predicted route to generate electronic marketing communications to those mobile devices for the identified merchants.

Exemplary Data Inputs and Outputs

FIG. 6 depicts an exemplary data flow among components of a system implementing an event detection mechanism in accordance with some exemplary embodiments of the present invention. The data flow 600 illustrates incoming and outgoing data through a system operable to receive location information and to determine the occurrence of events based on detection of congregating users. The process for identifying events begins with the receipt of location information by a location services element 604. This location information is received, directly or indirectly from one or more mobile devices 602. For example, the mobile devices 602 may report location information directly to the location services element 604 via an application executing on the mobile device 602, or the location services element 604 may obtain the location information from another service, such as a wireless carrier.

The location services element 604 provides information about the location of each device 602 to an event detection element 606. This location information may include coordinates of the particular device 602 and a token or other identifier associated with the device 602, among other information. The location services element 604 may be implemented, for example, by the location services circuitry 210 described above with respect to FIG. 2. In some embodiments, this other information may include, for example, a device velocity, a particular nearby point of interest or venue, or the like.

The event detection element 606 is operable to detect concentrations and congregations of mobile devices at particular locations to determine the occurrence of events involving groups of mobile devices. Detection of these events may include determining that greater than a threshold number of devices are present at a particular location, that those devices meet certain criteria for device density and velocity, and the like. To perform these functions, the event detection element 606 may also receive event data 608 and point of interest data 610. The event detection element 606 may be implemented, for example, by the event detection circuitry 212 described above with respect to FIG. 2.

The event data 608 may include information regarding event types, event locations, event schedules, and the like. For example, the event data 608 may include musician tour data, movie release schedules, concert hall schedules, sports schedules, or the like. The event data may also include more general information, such as a set of types of events that may occur at a particular venue or venue type (e.g., stadiums may have football games, soccer games, and concerts, while concert halls may have standup comedy performances, play productions, symphonies, musician performances, and the like), or the like. This event data may be manually curated (e.g., entered into the system by one or more users), or programmatically generated through the use of textual analysis and/or pattern recognition analysis of network content (e.g., scraping a venue website to identify event schedules). The event data 608 may be used by the event detection element 606 to map a detected congregation of mobile devices to a particular event.

The point of interest data 610 may include information relating to particular points of interest, such as location coordinates (e.g., latitude and longitude), a name of the point of interest, a type of the point of interest (e.g., store, park, stadium, etc.), a crowd capacity of the point of interest, or the like. This point of interest data 610 may be used by the event detection element 606 to identify likely points of interest or venues for association with detected congregations of mobile devices. The point of interest data 610 may also be used to map a point of interest to a particular event schedule identified in the event data 608.

The output of the event detection element is a set of one or more detected events 612. Examples of processes and algorithms for generation such detected events, and the content thereof, are described further below with respect to FIGS. 7-10.

The detected events 612 may be transmitted to a virtual perimeter generating element 614. The virtual perimeter generating element 614 may be implemented, for example, by virtual perimeter generating circuitry 214 as described above with respect to FIG. 2. The virtual perimeter generating element 614 may define a virtual perimeter around or about a location associated with a detected event 612. The virtual perimeter generating element 614 may define or refine a virtual perimeter around or about the location manually, dynamically based on proximity density mapping, concentration of mobile devices within the 'fence,' or based on a type of location (rural=likely larger vs. urban=likely smaller). The virtual perimeter generating element 614 may further enforce virtual perimeters and detect the presence of mobile devices within virtual perimeters by receiving location information from the location services element 604, and determining whether and when a given mobile device is present within a virtual perimetered location. The virtual perimeter generating element 614 may notify one or more external systems 616 of detections of mobile devices within a virtual perimetered area, such as an area associated with a detected event 612.

The external system 616 may include one or more systems that utilize notifications received from the virtual perimeter generating element 614 that indicate the presence of particular mobile devices at particular events. The external system 616 may take a variety of different actions upon such a detection. For example, in some embodiments the external system 616 may trigger a notification to the mobile device detected at the event, such as generation of an electronic marketing communication referencing a product or service associated with the event. As another example, the external system 616 may maintain one or more user profiles, such that the presence of a particular mobile device at an event triggers an update to a user profile associated with that device, indicating that they attended that event or an event of that event type. Such data may be employed for use in future marketing processes. For example, attendance at a football game may mark a user as a fan of a particular team, and a future campaign may be targeted to all users who are believed to be a fan of that team by virtue of their attendance at a past game, by virtue of their indication that they are a fan of that team (e.g., through a customer preferences dialogue on a website), or via various other mechanisms.

FIG. 7 illustrates an example of a data flow 700 for detecting an event using an event detection element 704 as described above with respect to FIGS. 2 and 6. The data flow 700 illustrates the various data inputs to the event detection element 704, and the process by which those inputs are used to output an identified event 722. The event detection element 704 may be an event detection element 606 as described above with respect to FIG. 6, implemented by event detection circuitry 210 as described above with respect to FIG. 2.

The event detection element 704 receives location data 702. As described above, the location data 702 may be received via a location services element. The location data 702 may include a device token 710 and a set of device coordinates 712, among other information. The device token 710 is an identifier associated with a particular device so as to identify the device that is associated with the location. The device token 710 may be an identifier that associates the particular device with a particular consumer or user login credentials for an account maintained by a promotion and marketing service. The device coordinates 712 are location coordinates that define the location of the device. This location may be provided in any of a variety of location formats, including but not limited to a latitude and longitude, a street address, or the like. The location data is received by a location processor 714 of the event detection element 704.

The location processor 714 processes the received location data 702 to add the location data to a location aggregation queue 716. The location aggregation queue 716 includes a data structure that stores recently received device locations for use in identification of congregating users. In order to improve processing efficiency, the location aggregation queue 716 may drop received locations from time to time. For example, locations may age off the queue (e.g., removed after 15 minutes, 30 minutes, or one hour), they may be removed after the queue reaches a certain size (e.g., the queue may store the most recently received 1,000, 10,000, or 1,000,000 locations), or the like.

A queue administrator 718 may manage the data stored within the location aggregation queue 716. The queue administrator 718 may function to identify the number of locations within the queue that are at the same location or within a threshold distance of one another. For example, the queue administrator 718 may, when a new location is added to the location aggregation queue 716, review the contents of the location aggregation queue 716 to count the number of locations that are within a particular proximity to the newly added location. In the event that at least a threshold number of locations stored in the location aggregation queue 716 are proximate to the newly received location, then that location may be flagged for an event identifier 720. In other embodiments, the queue administrator 718 may review the locations stored within the location aggregation queue 716 at periodic intervals (e.g., every second, every minute, every 15 minutes, every hour, or the like) for event detection purposes, rather than when new locations are added.

The queue administrator 718 may also serve to filter and otherwise edit the locations stored within the location aggregation queue 716. For example, in some embodiments the queue administrator 718 may identify locations associated with the same device token 710, and use changes in those locations over time to determine a velocity of the associated device. The queue administrator 718 may use such velocities and other characteristics of locations stored in the location aggregation queue 716 to improve the process of event detection. For example, the queue administrator 718 may ensure that locations counted to possibly exceed the threshold for flagging an event each have less than a particular predefined velocity. Such pruning of results may reduce "false positive" event detections in scenarios where large users are present at a location, but just passing through (e.g., traffic on a highway). Such velocity metrics may also be employed to predict future locations of each particular mobile device in an effort to identify patterns of movement toward or away from a particular location. Embodiments may therefore count not only mobile devices within a proximity to a particular location or one another, but also devices that are moving in a direction to be within that proximate location at a particular time period in the near future (e.g., by counting devices likely to be proximate to an area within 10 minutes based on the calculated velocity).

In some embodiments, detecting devices moving towards an event (e.g., stadium point of interest or other identified event) further comprises determining a mode of transportation utilized by the devices moving toward the event. This is particularly useful in further refining promotion selection and generation for the detected devices because the user of a mobile device traveling on a bus or train to an event may not be able to transport large or bulky items to or from the event (likely not furniture, but conveyable, personal, or consumable (e.g., food) items and/or services). In some embodiments, devices within a proximity of an identified event may be identified as being located at a bus stop or train stop to provide information as to what mode of transportation will be utilized toward the event. In some embodiments, third party data provided by bus and train or other transportation systems is aggregated to further inform such promotion selection and generation.

In some embodiments, environmental conditions are associated with an event by polling devices aggregated within or near the event and polling weather or other environmental APIs to acquire environmental data. Such environmental data is used to inform promotion selection and generation.

The queue administrator 718 may notify the event identifier 720 of circumstances where greater than a threshold number of devices are detected within proximity to one another. In response, the event identifier 720 may review the location associated with the congregating devices and determine whether an event is likely to be occurring. In some embodiments, identification of the event may be performed through counting the number of devices and verifying that those devices are staying within that particular area for at least a threshold period of time (e.g., 5 minutes, 10 minutes, 20 minutes). Such embodiments may be well-suited for identifying events that are not necessarily publicly scheduled or which are not necessarily associated with particular venues (e.g., flash mobs, protests, impromptu rallies, or the like).

In other embodiments, the event identifier 720 may utilize other data sources to determine whether an event is occurring. For example, the event identifier 720 may identify nearby points of interest to the location using point of interest data 708. The event identifier 720 may determine whether one or more points of interest that may support an event (e.g., concert venue, park, stadium, or other point of interest) are proximate to the identified location. In some embodiments, whether an event is occurring may be determined based on the nearby events. For example, a small concert hall may be associated with a much lower threshold of congregating users to identify an event than a large stadium.

The event identifier 720 may also leverage access to event data 706. As noted above, the event data 706 may include information related to events scheduled at particular venues, types of events that occur at particular venues, user activity related to certain events or event types (e.g., tailgating consumers may be more common at football games than at concerts, so the presence of consumers arriving early at an event parking lot is likely to be more indicative of a football game than a concert), or the like.

The event identifier 720 may use the event data 706 and the point of interest data 708 to attempt to determine the particular location, schedule, and type of event associated with the congregation of users identified by the queue administrator 718. The identified event 722 may include a particular date and time 724, a type of event 726, and the location of the event 728. It should be appreciated that an event may also include various other metadata or associated information, and that certain aspects of the event, such as the type of the event 726, may include various levels of detail. For example, an event may be labeled as a "concert", a "rock concert" or a "Foo Fighters concert" in increasing levels of granularity. A given event may include identifiers for one or more of these characteristics. The location of the event 728 may include a particular venue, or particular coordinates for the event. This location may be used, for example, by a virtual perimeter generating element to establish a virtual perimeter about the identified location to identify other mobile devices entering the event.

Exemplary Processes for Implementing an Event Detection System

FIGS. 8-10 illustrate flow diagrams depicting processes for implementing the systems described above with respect to FIGS. 1-7 to detect events based on received location information.

FIG. 8 illustrates a flow diagram depicting an example of a process 800 for taking action based on a detected event in accordance with some exemplary embodiments of the present invention. The process 800 illustrates how location data can be received from a plurality of mobile devices and used to dynamically identify events based on congregations of those mobile devices. The process 800 further includes detecting the presence of particular devices at the event and taking action based on the fact that those devices were detected at the event. The process 800 may be performed by elements of an apparatus 200, such as location services circuitry 210 acting in concert with event detection circuitry 212, virtual perimeter generating circuitry 214, and application circuitry 216 as described above with respect to FIG. 2.

At action 802, device locations are received. As described above, the device locations may be received via a location services element, which receives the device locations directly or indirectly from mobile devices. At action 804, the occurrence of an event is determined using those received locations. Exemplary processes for determining the occurrence of an event are described further below with respect to FIG. 9 and above with respect to FIGS. 4-7.

At action 806, devices at the event are identified. For example, an event may have an associated virtual perimeter such that devices that enter within the virtual perimeter are indicated as being located at the event. An example of a process for determining that a device is at an event is described further above with respect to FIGS. 4-7.

At action 808, an action or actions are taken based on detecting the presence of the device at the event. As described above, various actions may be undertaken, including but not limited to sending a notification to the detected mobile device, where the notification is associated with the event, updating a user profile of a user detected at the event, updating a set of data associated with the event, venue, or event type based on information associated with the user, or various other actions.

FIG. 9 illustrates a flow diagram depicting an example of a process 900 for detecting an event based on received location data in accordance with embodiments of the present invention. The process 900 describes how location information may be stored and processed to identify the presence of mobile devices at particular locations. The process 900 further describes filtering techniques that may be applied to such location data to improve the quality of event detection operations. In this manner, the process 900 may take into account the density of devices detected at a particular location (e.g., how many devices are present within a particular distance of one another), the velocity of devices (e.g., how far and in what direction have devices moved), and various other characteristics to improve the accuracy of the event detection operation. In particular, the process 900 illustrates how devices can be identified as sufficiently proximate and in sufficient density to one another to create an aggregation event, which may be utilized by other components of the system to determine additional data about the event.

At action 902, a device location is received. At action 904, a determination is made as to whether the device location is associated with a recently received location. This determination may be performed in response to receiving the location, or in some embodiments the determination may occur at particular intervals. The recent locations may be stored in a queue such that stored locations periodically age out of the queue and are removed. In some embodiments, the received location is also compared to recently generated aggregation events to determine if the received location is associated with any of those aggregation events prior to storage in the queue.

If the device location is associated with a recent location, the process proceeds to action 906. Otherwise, the process proceeds to action 916, which the device location is stored and the process awaits another location.

At action 906, the number of devices in the vicinity and/or moving to the vicinity of the received device location are counted. For example, the process 900 may review each of the entries stored in a location aggregation queue to determine how many of those locations are at or near the received location. Those devices may also be filtered at action 908, where devices with greater than a threshold velocity are removed (indicating that such devices are transient). The filtering operation may also include dynamically setting a threshold for identification of an event based on the density of devices. For example, if the devices are present over a more diffuse area (e.g., a larger distance between devices), then a larger count of devices may be required to generate an aggregation event, while if the devices are closer together, a lower count may be required.

At action 910, a determination is made as to whether the number of devices in proximity with one another exceeds a threshold. If the count of devices is greater than the threshold, the process proceeds to action 912. Otherwise, the process proceeds to action 916 to store the device location.

At action 912, an aggregation event is created based on the number of devices in proximity with one another exceeding the threshold. At action 914, the aggregation event is stored in memory. Storage of the aggregation event may include transmitting the aggregation event to another component of the system, such as an event identifier as described above with respect to FIG. 7, element 720. After creating and storing the aggregation event, the process proceeds to action 916 to store the received device location. The process 900 may then terminate or repeat as needed to address future receipt of additional device locations.

FIG. 10 illustrates a flow diagram depicting an example of a process 1000 for identifying event data based on an identified aggregation event in accordance with some exemplary embodiments of the present invention. As described above with respect to FIG. 9, embodiments may identify aggregation events where greater than a threshold number of consumer devices are detected in proximity with one another. The process 1000 describes techniques for obtaining further information about these events which may be used to inform the process by which the identified events are used by other components of a system.

At action 1002, the process receives an aggregation event. For example, an aggregation event may be identified by the process described above with respect to FIG. 9.

At action 1004, the process determines the type and location of the aggregation event. Determining the type and location of the event may be performed by identifying nearby points of interest to a location about which the aggregation event is occurring. For example, embodiments may identify a latitude and longitude coordinate associated with the aggregation event and analyze points of interest within a certain radius of those coordinates. These points of interest may be provided as a set of map data, such as the point of interest data as described above with respect to FIG. 6. Such map data may be provided, for example, by geographic information services vendors or the like. Points of interest that are proximate to the aggregation event may be reviewed to attempt to determine which point of interest, if any, is serving as a venue for the event. If two or more points of interest seem compatible with the quantity, velocity, and diffusion of mobile devices associated with the aggregation event, then embodiments may attempt to determine the appropriate event venue through secondary characteristics such as user profiles of users associated with the detected mobile devices (e.g., all users share a profile indicating they like a particular band that is playing at one of the points of interest, or it is Sunday and there is a football game scheduled for a nearby stadium). The event type may similarly be determined by these or other characteristics, including external data as described above with respect to FIGS. 6-7.

After associating an event type and a location with the event, the process proceeds to action 1006 to generate a virtual perimeter about the event. Generating the virtual perimeter provides a mechanism for identifying future mobile devices entering the event without necessarily needing to detect the event again using a newly received mobile device location.

Some embodiments may leverage access to a wireless carrier system to improve the ability to determine whether particular devices are present at an event. As described above, optional steps 1008 and 1010 depict processes for using such wireless carrier systems where users have "opted in" to wireless carrier provided location information to allow the process 1000 to obtain the location of devices that are not otherwise configured to directly provide location information to the process 1000. Accordingly, at action 1008, the process initiates a request to the wireless carrier, such as by requesting from the carrier a list of mobile devices that have "opted in" and which are proximate to a particular location. At action 1010, the list of mobile devices is received from the carrier for use in detection of the mobile device within the virtual perimeter.

At action 1012, the presence of mobile devices within the virtual perimeter is detected. This detection operation may include detection of the original devices that were used to establish the event in the first place, to ensure that every present device receives the benefit of event-driven notifications or other functionality of the system. In other embodiments the virtual perimeter may only be applied to future devices that enter the area, as the generation of notifications and other actions may be performed prior to generation of the virtual perimeter as soon as the event is detected.

At action 1014, various actions may be taken based on the presence of the device within the virtual perimeter. For example, as described, devices at the event may be notified of goods or services associated with the event, or detection at the event may be used to update a user profile to indicate the user's interest in the event type, or the like.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system, comprising one or more computers and one or more storage devices storing instructions that are operable, when executed by the one or more computers, to cause the one or more computers to:
generate an aggregation event comprising an event profile, the event profile comprising at least an event location;
in response to detecting location data for a mobile device based on an internal positioning mechanism of the mobile device, retrieve a plurality of stored locations from a database based on the location data;
determine that the plurality of stored locations is within a predefined distance of the event location, wherein each stored location of the plurality of stored locations is associated with a respective mobile device of a plurality of mobile devices;
determine, for each respective mobile device of the plurality of mobile devices, time data indicative of an interval of time that the mobile device is within a virtual perimeter for the event location;
generate a filtered plurality of stored locations associated with a first subset of the plurality of mobile devices, each having first respective time data satisfying a defined threshold value, wherein generating the filtered plurality of stored locations comprises:
removing, from the plurality of stored locations, one or more false-positive stored locations associated with a second subset of the plurality of mobile devices, each having second respective time data failing to satisfy the defined threshold value, wherein the first respective time data and the second respective time data correspond to a respective interval of time; and
in response to determining that a threshold number of the filtered plurality of stored locations is within the predefined distance, generate a modified virtual perimeter for the event location based on the filtered plurality of stored locations; and
update the event profile with one or more shared profile characteristics associated with user profile data for respective user identities of the first subset of the plurality of mobile devices.

2. The system of claim 1, wherein the modified virtual perimeter comprises a plurality of latitudinal and longitudinal coordinates.

3. The system of claim 1, wherein the modified virtual perimeter comprises an array of latitudinal and longitudinal coordinates.

4. The system of claim 1, wherein the one or more storage devices store instructions that are operable, when executed by the one or more computers, to further cause the one or more computers to:
transmit a notification to the mobile device in response to a determination that the mobile device is associated with the modified virtual perimeter.

5. The system of claim 1, wherein the one or more storage devices store instructions that are operable, when executed by the one or more computers, to further cause the one or more computers to:
determine a mode of transport for the mobile device in response to a determination that the mobile device is associated with the modified virtual perimeter; and
transmit a notification to the mobile device based on the mode of transport for the mobile device.

6. The system of claim 1, wherein the one or more storage devices store instructions that are operable, when executed by the one or more computers, to further cause the one or more computers to:
generate user profile data for a user identity associated with the mobile device in response to a determination that the mobile device is associated with the modified virtual perimeter.

7. The system of claim 1, wherein the one or more storage devices store instructions that are operable, when executed by the one or more computers, to further cause the one or more computers to:
generate a notification for the mobile device based on the updated event profile.

8. The system of claim 1, wherein the one or more storage devices store instructions that are operable, when executed by the one or more computers, to further cause the one or more computers to:
determine data for the event location based on point of interest data associated with the event location; and
generate a notification for the mobile device based on the data for the event location.

9. The system of claim 7, wherein the one or more storage devices store instructions that are operable, when executed by the one or more computers, to further cause the one or more computers to:
determine data for the event location based on social media data associated with the event location; and
generate a notification for the mobile device based on the data for the event location.

10. A computer-implemented method, the method comprising:
generating an aggregation event comprising an event profile, the event profile comprising at least an event location;
in response to detecting location data for a mobile device based on an internal positioning mechanism of the mobile device, retrieving, by a computing device comprising a processor, a plurality of stored locations from a database based on the location data;
determining, by the computing device, that the plurality of stored locations is within a predefined distance of the event location, wherein each stored location of the plurality of stored locations is associated with a respective mobile device of a plurality of mobile devices;
determining, by the computing device, for each respective mobile device of the plurality of mobile devices, time data indicative of an interval of time that the mobile device is within a virtual perimeter for the event location;
generating, by the computing device, a filtered plurality of stored locations associated with a first subset of the plurality of mobile devices, each having first respective time data satisfying a defined threshold value, wherein generating the filtered plurality of stored locations comprises:
removing, from the plurality of stored locations, one or more false-positive stored locations associated with a second subset of the plurality of mobile devices, each having second respective time data failing to satisfy the defined threshold value, wherein the first respective time data and the second respective time data correspond to a respective interval of time; and
in response to determining that a threshold number of the filtered plurality of stored locations is within the predefined distance, generating, by the computing device, a modified virtual perimeter for the event location based on the filtered plurality of stored locations; and updating the event profile with one or more shared profile characteristics associated with user profile data for respective user identities of the first subset of the plurality of mobile devices.

11. The computer-implemented method of claim 10, wherein the generating the modified virtual perimeter comprises determining a plurality of latitudinal and longitudinal coordinates.

12. The computer-implemented method of claim 10, further comprising:

transmitting, by the computing device, a notification to the mobile device in response to a determination that the mobile device is associated with the modified virtual perimeter.

13. The computer-implemented method of claim 10, further comprising:

determining, by the computing device, a mode of transport for the mobile device in response to a determination that the mobile device is associated with the modified virtual perimeter;

transmitting, by the computing device, a notification to the mobile device based on the mode of transport for the mobile device.

14. The computer-implemented method of claim 10, further comprising:

generating, by the computing device, user profile data for a user identity associated with the mobile device in response to a determination that the mobile device is associated with the modified virtual perimeter.

15. The computer-implemented method of claim 10, further comprising:

determining, by the computing device, data the event location based on social media data associated with the event location; and generating, by the computing device, a notification for the mobile device based on the data for the event location.

16. The computer-implemented method of claim 10, further comprising:

determining, by the computing device, data for the event location based on point of interest data associated with a venue for the event location; and generating, by the computing device, a notification for the mobile device based on the data for the event location.

17. The computer-implemented method of claim 10, further comprising:

determining, by the computing device, data for the event location based on event data that comprises an event schedule associated with a venue for the event location; and generating, by the computing device, a notification for the mobile device based on the data for the event location.

18. A computer program product, stored on a non-transitory computer readable medium, comprising instructions that when executed by one or more computers cause the one or more computers to:

generate an aggregation event comprising an event profile, the event profile comprising at least an event location;

in response to detecting location data for a mobile device based on an internal positioning mechanism of the mobile device, retrieve a plurality of stored locations from a database based on the location data;

determine that the plurality of stored locations is within a predefined distance of the event location, wherein each stored location of the plurality of stored locations is associated with a respective mobile device of a plurality of mobile devices;

determine, for each respective mobile device of the plurality of mobile devices, time data indicative of an interval of time that the mobile device is within a virtual perimeter for the event location;

generate a filtered plurality of stored locations associated with a first subset of the plurality of mobile devices each having first respective time data satisfying a defined threshold value, wherein generating the filtered plurality of stored locations comprises:

removing, from the plurality of stored locations, one or more false-positive stored locations associated with a second subset of the plurality of mobile devices each having second respective time data failing to satisfy the defined threshold value, wherein the first respective time data and the second respective time data correspond to a respective interval of time; and in response to determining that a threshold number of the filtered plurality of stored locations is within the predefined distance, generate a modified virtual perimeter for the event location based on the filtered plurality of stored locations; and updating the event profile with one or more shared profile characteristics associated with user profile data for respective user identities of the first subset of the plurality of mobile devices.

19. The computer program product of claim 18, further comprising instructions that when executed by the one or more computers cause the one or more computers to:

transmit a notification to the mobile device in response to a determination that the mobile device is associated with the modified virtual perimeter.

20. The computer program product of claim 18, further comprising instructions that when executed by the one or more computers cause the one or more computers to:

determine data the event location based on social media data associated with the event location; and generate a notification for the mobile device based on the data for the event location.

\* \* \* \* \*

UNITED STATES PATENT AND TRADEMARK OFFICE
CERTIFICATE OF CORRECTION

| | | |
|---|---|---|
| PATENT NO. | : 12,127,071 B2 | Page 1 of 1 |
| APPLICATION NO. | : 17/478175 | |
| DATED | : October 22, 2024 | |
| INVENTOR(S) | : Anthony Joseph | |

It is certified that error appears in the above-identified patent and that said Letters Patent is hereby corrected as shown below:

In the Claims

In Column 35, Line 36, Claim 15, delete "data the" and insert -- data for the --, therefor.

In Column 36, Line 50, Claim 20, delete "data the" and insert -- data for the --, therefor.

Signed and Sealed this
Seventeenth Day of December, 2024

Derrick Brent
*Acting Director of the United States Patent and Trademark Office*